United States Patent
Miyashima

(10) Patent No.: US 9,568,852 B2
(45) Date of Patent: Feb. 14, 2017

(54) IMAGE FORMING APPARATUS WITH MIRROR CURVING ADJUSTMENT UNIT

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Atsushi Miyashima, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/791,707

(22) Filed: Jul. 6, 2015

(65) Prior Publication Data

US 2017/0010561 A1    Jan. 12, 2017

(51) Int. Cl.
*G03G 15/04* (2006.01)
*G02B 26/12* (2006.01)

(52) U.S. Cl.
CPC ....... *G03G 15/04036* (2013.01); *G02B 26/125* (2013.01)

(58) Field of Classification Search
CPC .................. G03G 15/041; G03G 15/04036
See application file for complete search history.

(56) References Cited

U.S. PATENT DOCUMENTS

| 5,201,508 A * | 4/1993 | Kuo ................ B65H 3/042 271/10.03 |
| 6,219,082 B1 * | 4/2001 | Rumsey ............ B41J 2/471 347/242 |
| 2008/0212155 A1 * | 9/2008 | Shoji .............. G02B 26/0825 359/198.1 |
| 2009/0009836 A1 | 1/2009 | Narita et al. |
| 2010/0309278 A1 | 12/2010 | Kodo et al. |

OTHER PUBLICATIONS

Non-Final Office Action for U.S. Appl. No. 15/242,805 mailed on Sep. 13, 2016.

* cited by examiner

*Primary Examiner* — Minh Phan
*Assistant Examiner* — Victor Verbitsky
(74) *Attorney, Agent, or Firm* — Amin, Turocy & Watson LLP

(57) ABSTRACT

An image forming apparatus according to an embodiment includes a photoconductive drum, a light scanning unit, a reflection mirror, a support member, and a cam. The light scanning unit forms a light scanning beam with which the photoconductive drum is irradiated. The reflection mirror guides the light scanning beam toward the photoconductive drum. The support member supports both ends of the reflection mirror in a longitudinal direction. The cam is provided in the support member. The cam comes into contact with the reflection mirror in an intermediate portion of the reflection mirror in the longitudinal direction. The cam moves the intermediate portion in a plate thickness direction of the reflection mirror with respect to a support position by the support member.

9 Claims, 11 Drawing Sheets

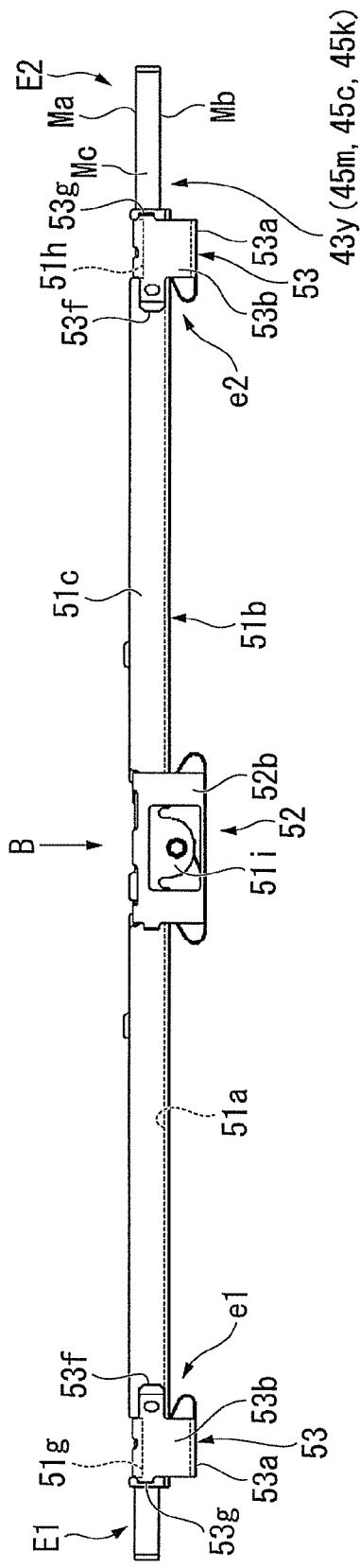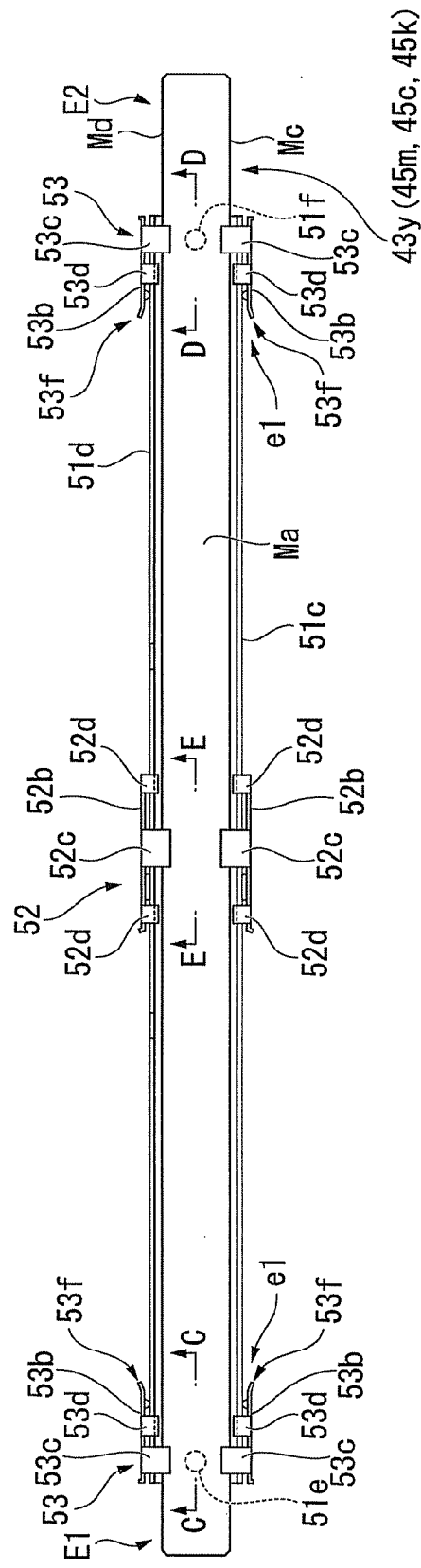

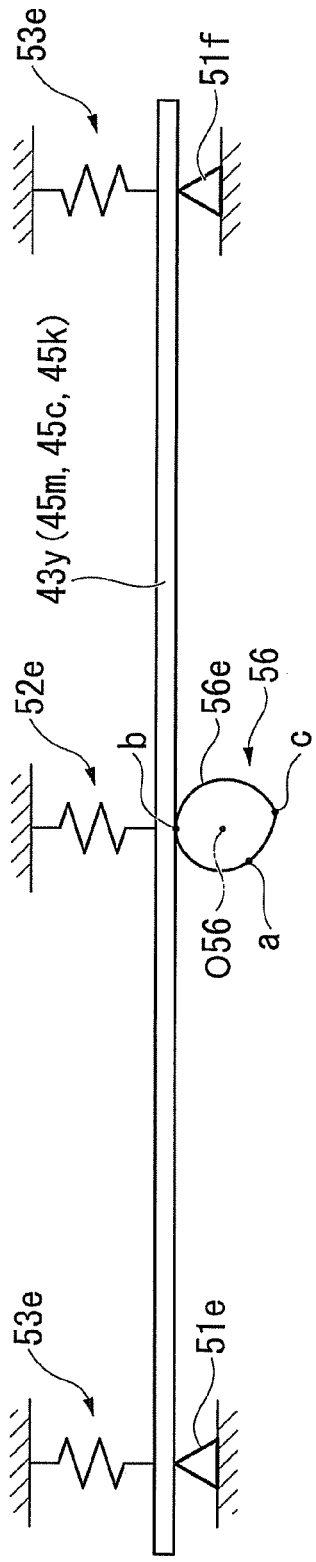
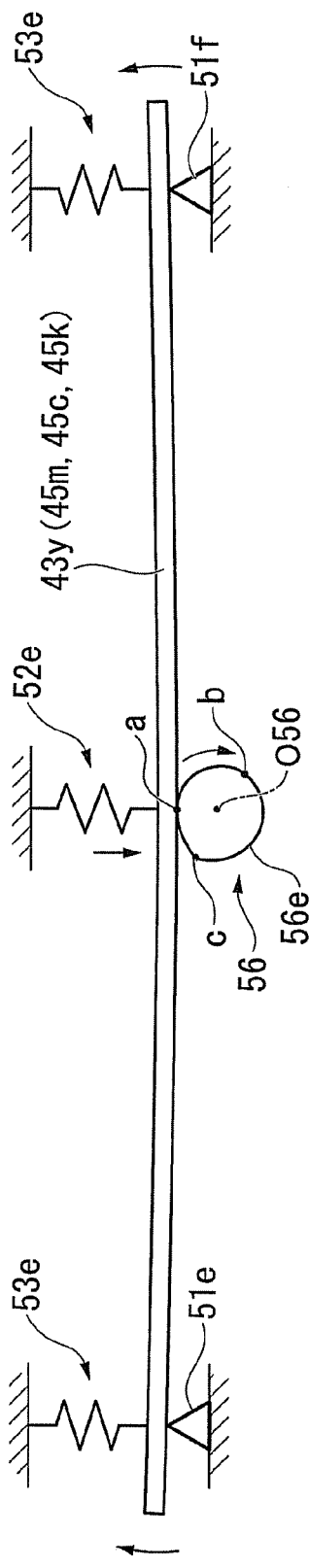
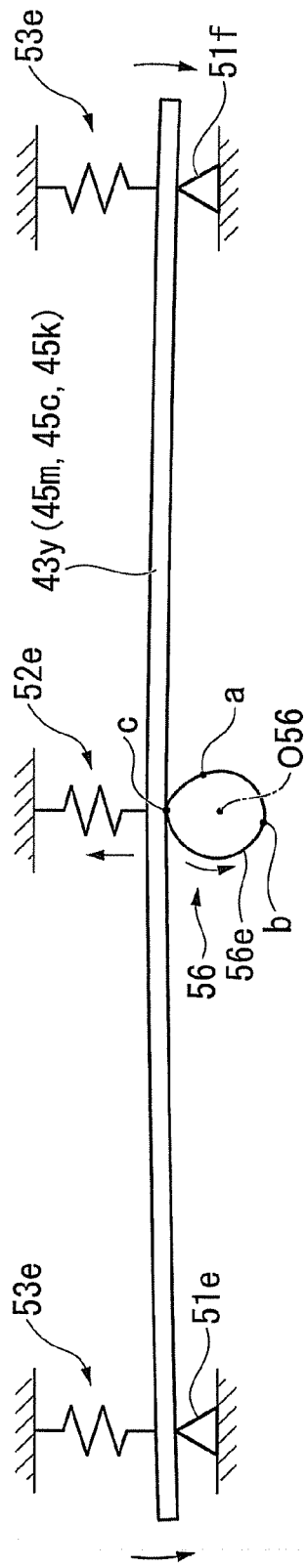

IMAGE FORMING APPARATUS WITH MIRROR CURVING ADJUSTMENT UNIT

FIELD

Embodiments described herein relate generally to an image forming apparatus.

BACKGROUND

There are image forming apparatuses that form images by color toner. The image forming apparatuses irradiate photoconductive drums with light scanning beams. The image forming apparatuses form electrostatic latent images on the photoconductive drums. The image forming apparatuses develop the electrostatic latent images to form toner images.

For example, an image forming apparatus includes a plurality of photoconductive drums. The image forming apparatus irradiates each of the photoconductive drums with a light scanning beam. It is necessary to accurately position relative positions of the toner images on the photoconductive drums between the photoconductive drums. In particular, if the scanning lines of the light scanning beams are bent, image quality deteriorates.

The bending of the scanning lines of the light scanning beams occurs due to various component errors and arrangement errors in scanning optical systems. In particular, in full-color image forming apparatuses, light scanning beams are folded using a plurality of reflection mirrors. Therefore, if the reflection surface of each reflection mirror is curved due to a processing error, the bending of the scanning lines increases.

In the related art, to correct the bending of the scanning lines, curving amounts of reflection mirrors are adjusted in some cases. For example, the rear surfaces of the reflection mirrors are pressed by retractable mechanisms such as screws.

However, in such adjustment methods, the reflection mirrors are curved only in one direction. Further, at the time of the adjustment, a stopper is necessary so that the reflection mirrors do not exceed deformation limits. Furthermore, since the retractable mechanisms are operated from the rear surfaces of the reflection mirrors toward the mirrors, operability is poor.

DESCRIPTION OF THE DRAWINGS

FIG. 4 is a schematic front view illustrating an example of the configuration of a mirror curving adjustment unit.

FIG. 5 is a schematic diagram when viewed from B in FIG. 4.

FIGS. 12A to 12C are schematic cross-sectional views for describing an operation for curving adjustment of the reflection mirror.

DETAILED DESCRIPTION

Figure 1:
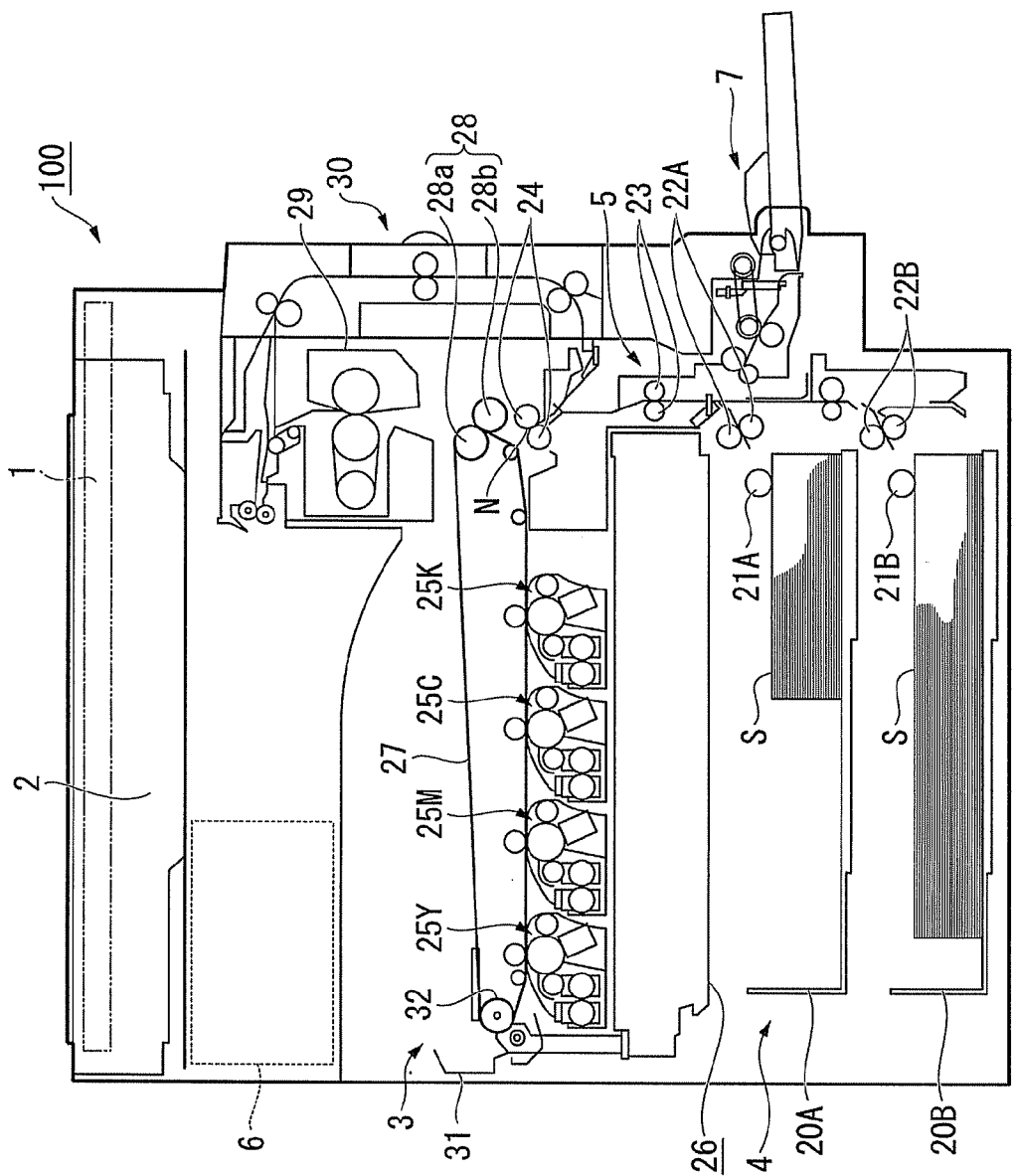
FIG. 1 is a schematic cross-sectional view illustrating an example of the entire configuration of an image forming apparatus according to an embodiment.

An image forming apparatus according to an embodiment includes a photoconductive drum, a light scanning unit, a reflection mirror, a support member, and a cam. The light scanning unit forms a light scanning beam with which the photoconductive drum is irradiated. The reflection mirror guides the light scanning beam toward the photoconductive drum. The support member supports both ends of the reflection mirror in a longitudinal direction. The cam is provided in the support member. The cam comes into contact with the reflection mirror in an intermediate portion of the reflection mirror in the longitudinal direction. The cam moves the intermediate portion in a plate thickness direction of the reflection mirror with respect to a support position by the support member.

Embodiment

Hereinafter, an image forming apparatus 100 according to an embodiment will be described with reference to the drawings. In the drawings, the same reference numerals are given to the same configurations unless otherwise stated.

Figure 2:
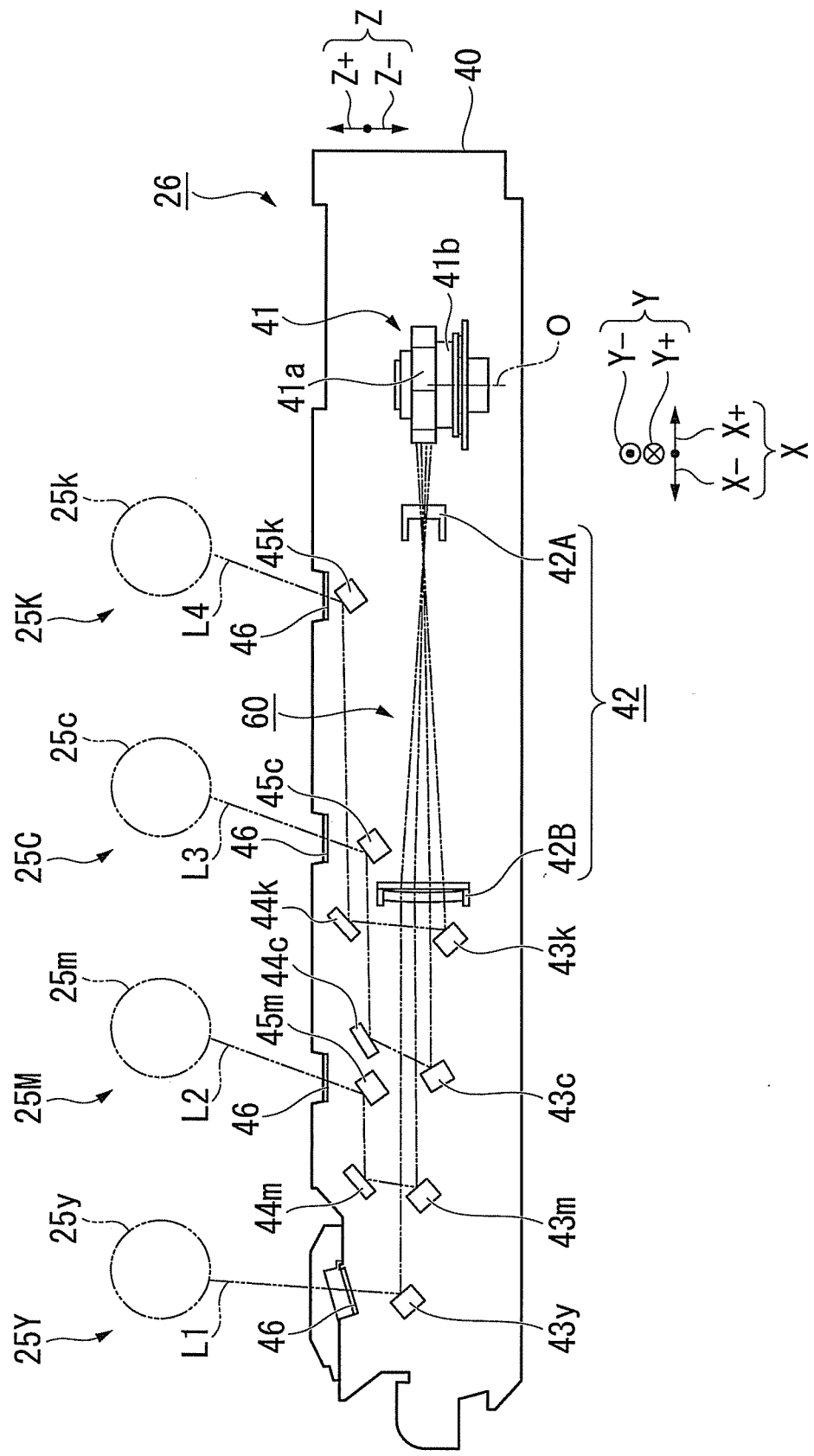
FIG. 2 is a schematic diagram illustrating an example of the configuration of a laser scanning unit.
Figure 3:
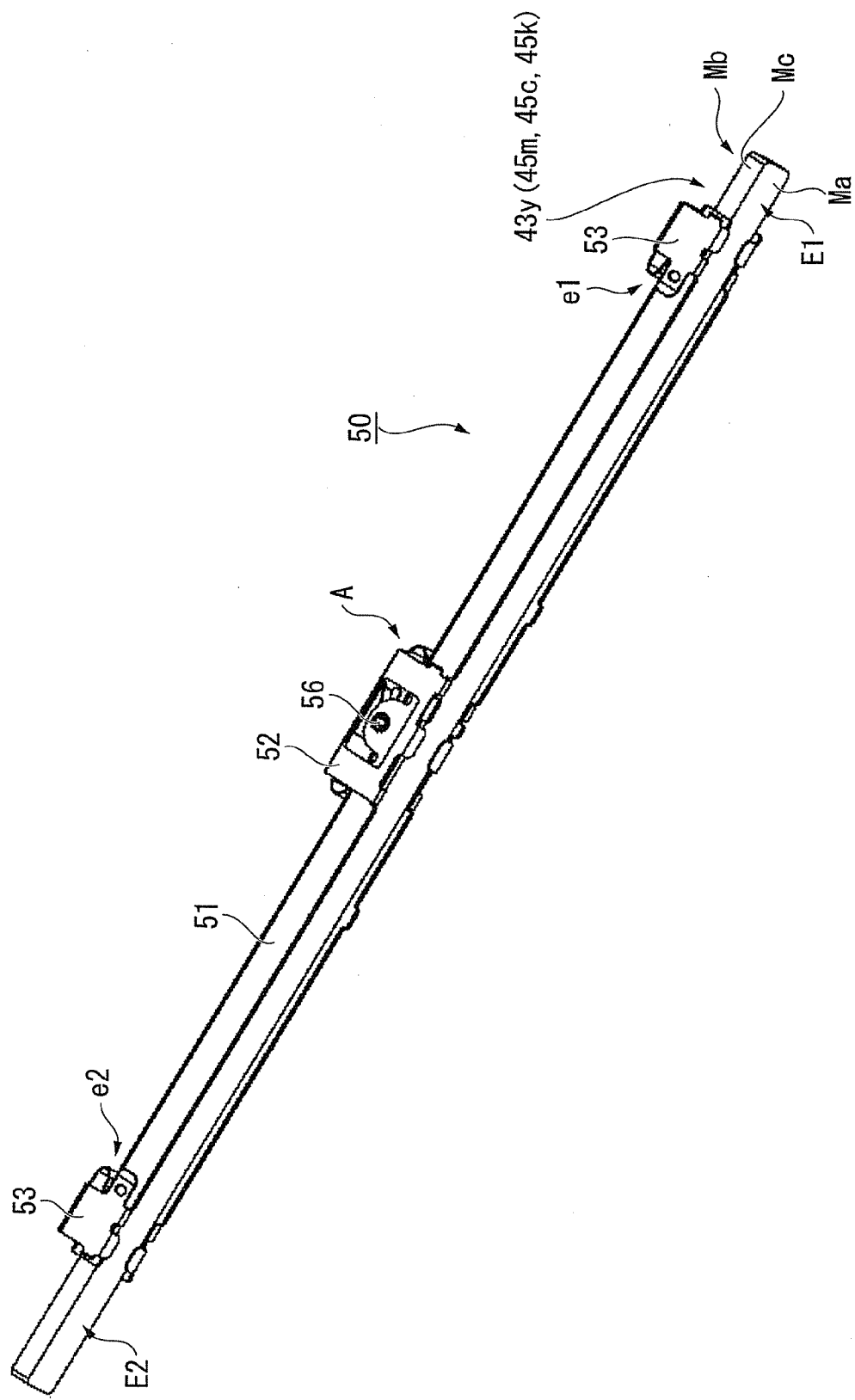
FIG. 3 is a schematic perspective view illustrating an example of the configuration of a reflection mirror.
Figure 6:
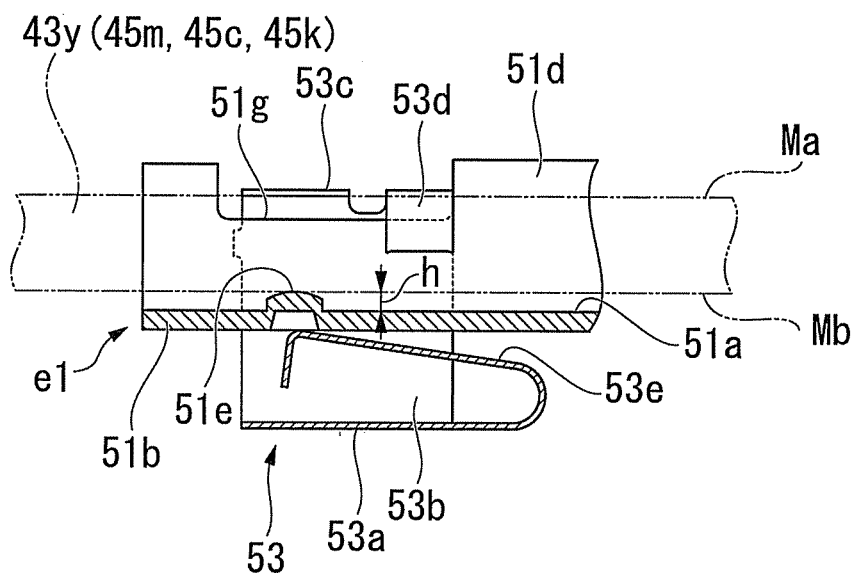
FIG. 6 is a schematic cross-sectional diagram taken along the line C-C in FIG. 5.
Figure 7:
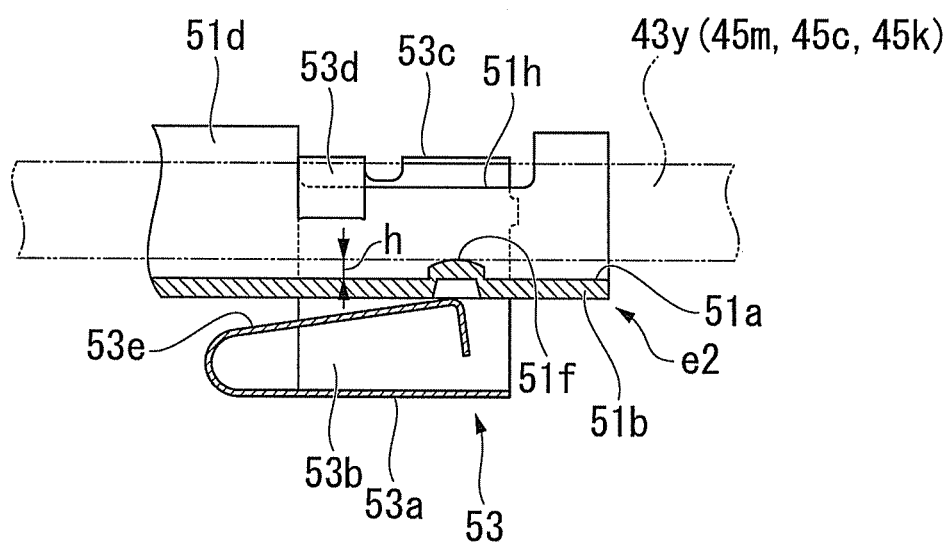
FIG. 7 is a schematic cross-sectional diagram taken along the line D-D in FIG. 5.
Figure 8:
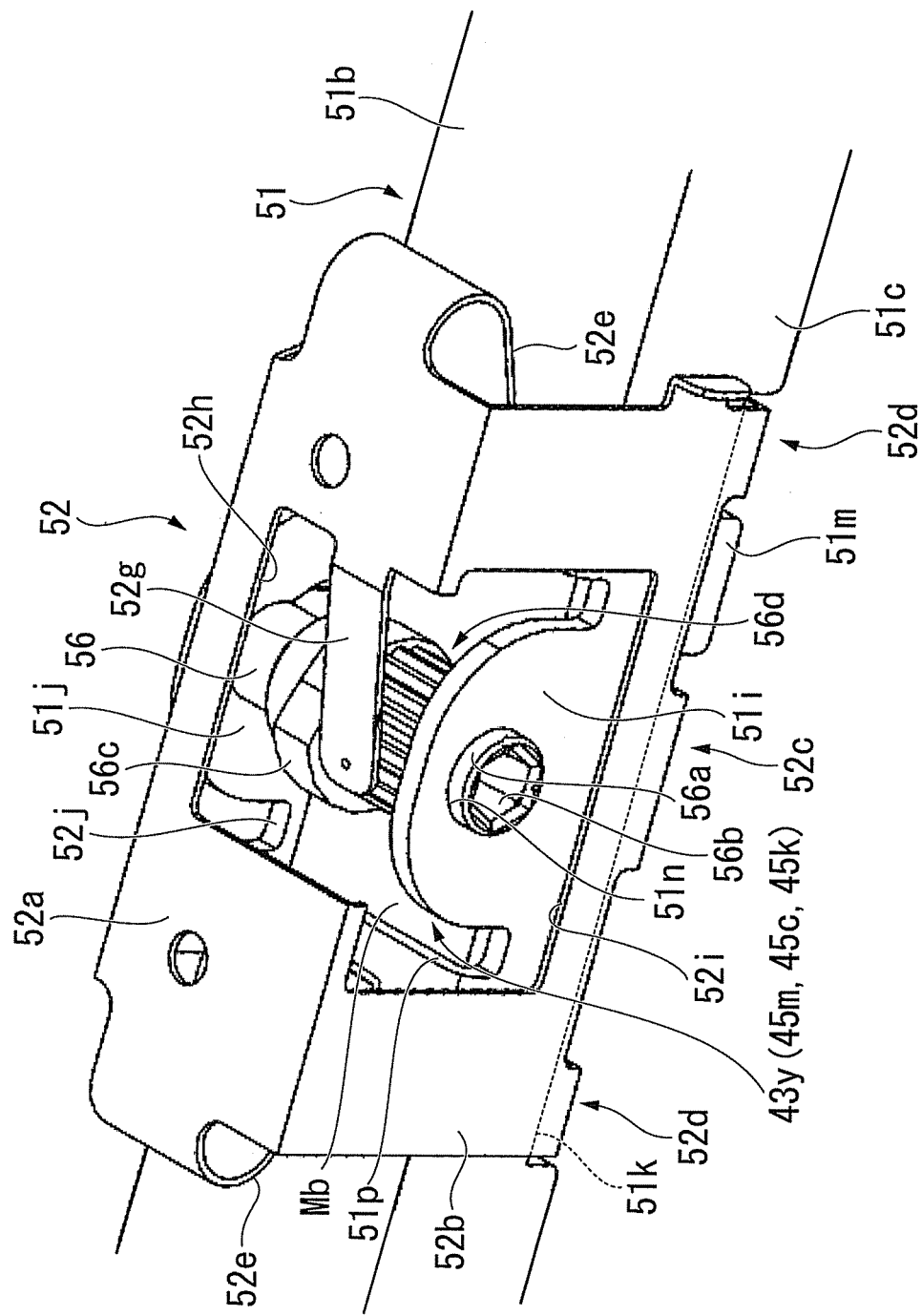
FIG. 8 is a schematic perspective view illustrating an example of the configuration of an elastic member.
Figure 9:
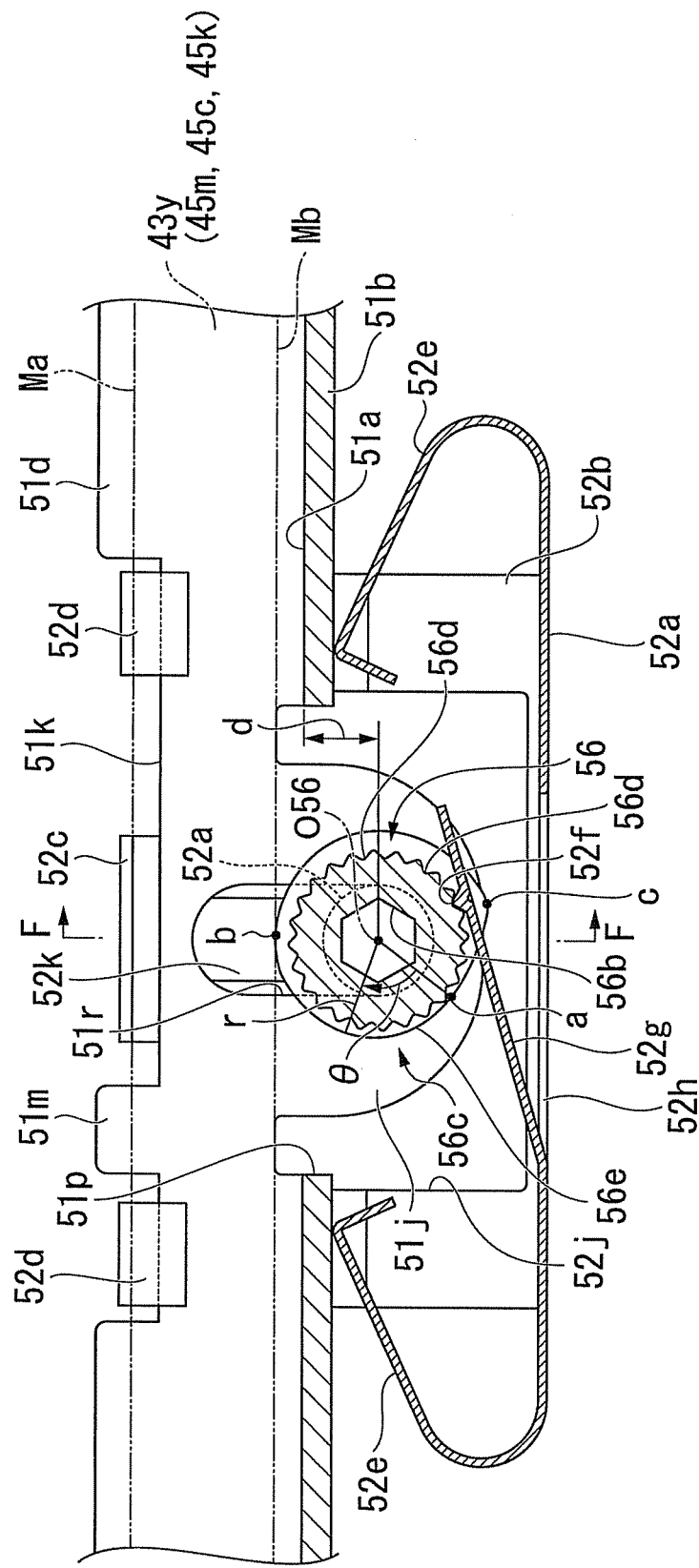
FIG. 9 is a schematic cross-sectional diagram taken along the line E-E in FIG. 5.
Figure 10:
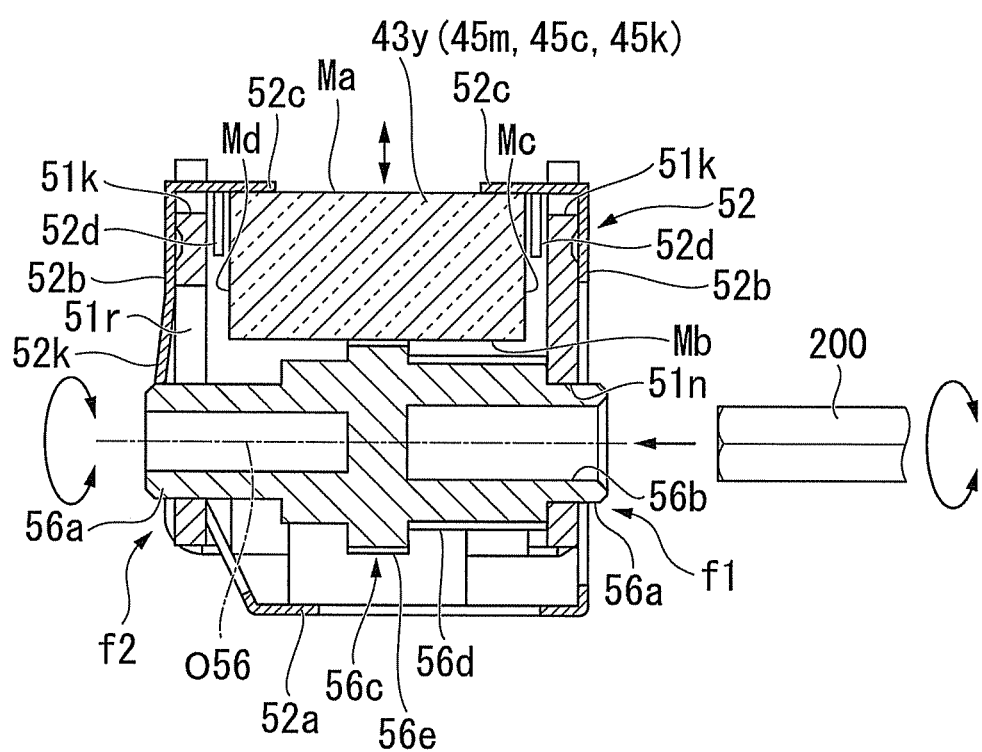
FIG. 10 is a schematic cross-sectional diagram taken along the line F-F in FIG. 9.
Figure 11A:
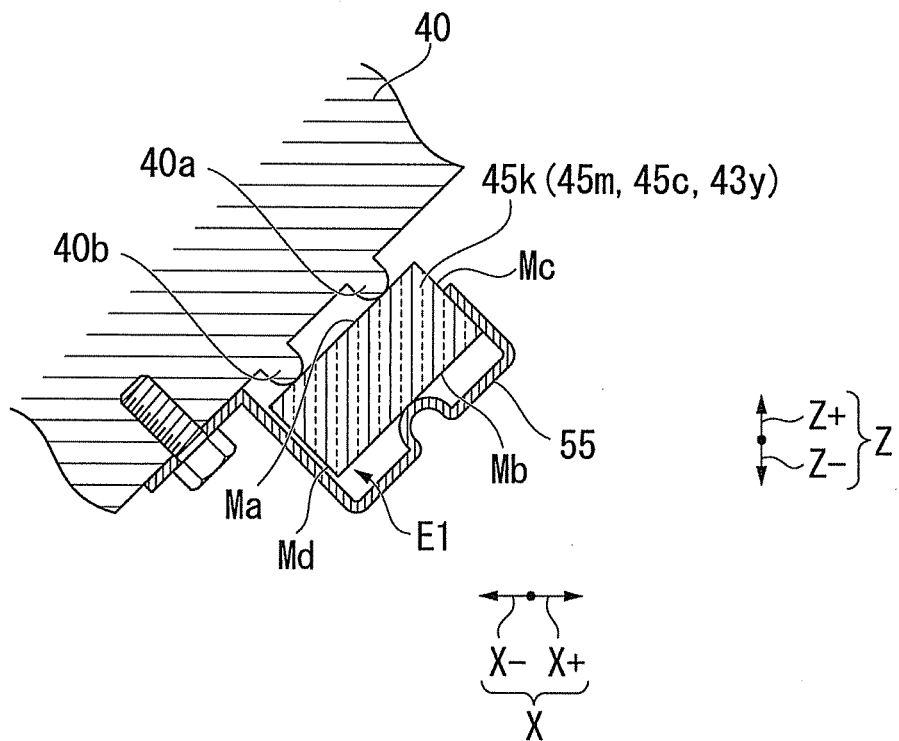
FIG. 11A is a schematic cross-sectional view illustrating an example of a support shape of an end portion of the reflection mirror.
Figure 11B:
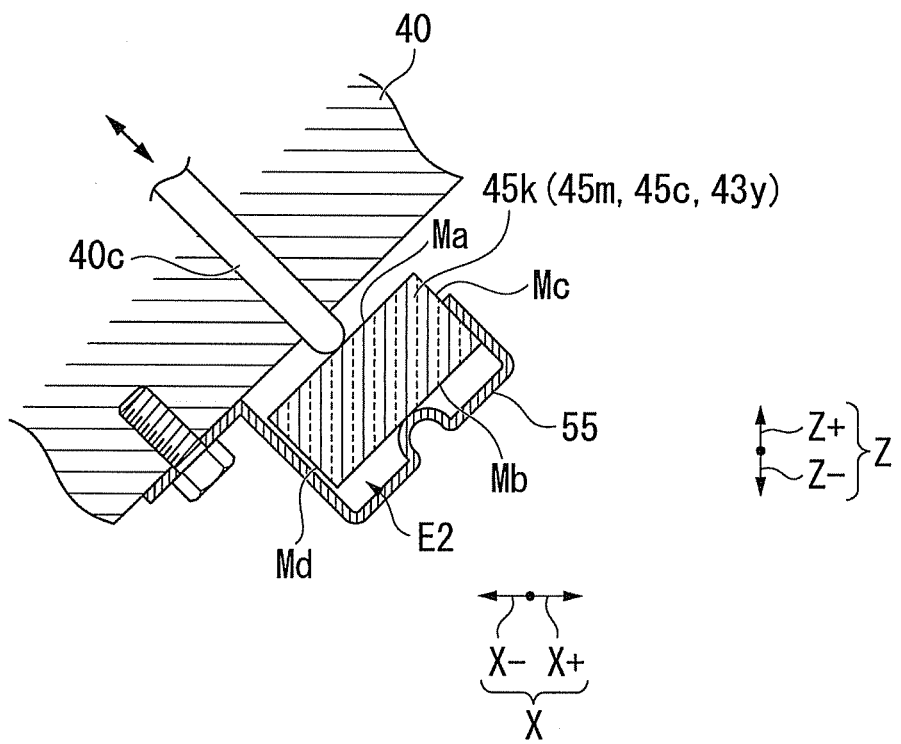
FIG. 11B is a schematic cross-sectional view illustrating an example of the support shape of the end portion of the reflection mirror.

FIG. 1 is a schematic cross-sectional view illustrating an example of the entire configuration of an image forming apparatus according to an embodiment. FIG. 2 is a schematic diagram illustrating an example of the configuration of a laser scanning unit of the image forming apparatus according to the embodiment. FIG. 3 is a schematic perspective view illustrating an example of the configuration of a reflection mirror of the image forming apparatus according to the embodiment. FIG. 4 is a schematic front view illustrating an example of the configuration of a mirror curving adjustment unit of the image forming apparatus according to the embodiment. FIG. 5 is a schematic diagram when viewed from B in FIG. 4. FIG. 6 is a schematic cross-sectional diagram taken along the line C-C in FIG. 5. FIG. 7 is a schematic cross-sectional diagram taken along the line D-D in FIG. 5. FIG. 8 is a schematic perspective view illustrating an example of an elastic member of the image forming apparatus according to the embodiment. FIG. 9 is a schematic cross-sectional diagram taken along the line E-E in FIG. 5. FIG. 10 is a schematic cross-sectional diagram taken along the line F-F in FIG. 9. FIG. 11A is a schematic cross-sectional view illustrating an example of a support shape of an end portion of the reflection mirror of the image forming apparatus according to the embodiment. FIG. 11B is a schematic cross-sectional view illustrating an example of the support shape of the end portion of the reflection mirror of the image forming apparatus according to the embodiment.

As illustrated in FIG. 1, the image forming apparatus 100 according to the embodiment includes a control panel 1, a scanner unit 2, a printer unit 3, a sheet supply unit 4, a carrying unit 5, and a control unit 6.

The control panel 1 operates the image forming apparatus 100 when an operator performs an operation.

The scanner unit 2 reads image information of a copy target as brightness and darkness of light. The scanner unit 2 outputs the read image information to the printer unit 3.

The printer unit 3 forms an output image (hereinafter referred to as a toner image) by a developer including toner or the like based on the image information read by the scanner unit 2 or image information from the outside.

The printer unit 3 transfers the toner image to the surface of a sheet S. The printer unit 3 applies heat and pressure to the toner image on the surface of the sheet S to fix the toner image onto the sheet S.

The sheet supply unit 4 supplies sheets S to the printer unit 3 one by one at a timing at which the printer unit 3 forms the toner image. The sheet supply unit 4 includes a plurality of sheet feeding cassettes 20A and 20B. Each of the sheet feeding cassettes 20A and 20B accommodates the sheets S of sizes and kinds set in advance. The sheet feeding cassettes 20A and 20B include pickup rollers 21A and 21B and sheet feeding rollers 22A and 22B, respectively. The pickup rollers 21A and 21B respectively pick up the sheets S one by one from the sheet feeding cassettes 20A and 20B. The picked-up sheets S are moved to the carrying unit 5 by the respective sheet feeding rollers 22A and 22B.

The carrying unit 5 includes carrying rollers 23 and resist rollers 24. The carrying unit 5 carries the sheet S supplied from the sheet supply unit 4 to the resist rollers 24. The resist rollers 24 carry the sheet S at a timing at which the printer unit 3 transfers the toner image to the sheet S.

The carrying rollers 23 abuts the front end of the sheet S in a carrying direction to a nip N of the resist rollers 24. The carrying rollers 23 arrange the position of the front end of the sheet S in the carrying direction by bending the sheet S.

The resist rollers 24 match the front end of the sheet S in the nip N. Further, the resist rollers 24 carry the sheet S toward a transfer unit 28 to be described below.

Next, the detailed configuration of the printer unit 3 will be described.

The printer unit 3 includes image forming units 25Y, 25M, 25C, and 25K, a laser scanning unit 26, an intermediate transfer belt 27, the transfer unit 28, a fixing unit 29, and a transfer belt cleaning unit 31.

Each of the image forming units 25Y, 25M, 25C, and 25K forms the toner image on the intermediate transfer belt 27.

As illustrated in FIG. 2, the image forming units 25Y, 25M, 25C, and 25K include photoconductive drums $25y$, $25m$, $25c$, and $25k$, respectively. The image forming units 25Y, 25M, 25C, and 25K form the toner images of yellow, magenta, cyan, and black on the photoconductive drums $25y$, $25m$, $25c$, and $25k$.

The photoconductive drums $25y$, $25m$, $25c$, and $25k$ are disposed in parallel with spaces therebetween. Central axis lines of the photoconductive drums $25y$, $25m$, $25c$, and $25k$ are disposed on the same horizontal surface. The central axis lines of the photoconductive drums $25y$, $25m$, $25c$, and $25k$ are perpendicular to the carrying direction of the sheet S in the printer unit 3.

As illustrated in FIG. 1, a known charging unit, a known developing unit, a known transfer roller, a known cleaning unit, and a known discharging unit are disposed around each of the photoconductive drums $25y$, $25m$, $25c$, and $25k$. The transfer roller faces the photoconductive drum. The intermediate transfer belt 27 to be described below is nipped between the transfer roller and the photoconductive drum. The laser scanning unit 26 is disposed below the charging unit and the developing unit.

As illustrated in FIG. 2, the laser scanning unit 26 irradiates the surfaces of the photoconductive drums $25y$, $25m$, $25c$, and $25k$ with laser beams L1, L2, L3, and L4 (laser scanning beam). Image information of yellow, magenta, cyan, and black is supplied to the laser scanning unit 26.

The laser beams L1, L2, L3, and L4 are modulated based on the image information of yellow, magenta, cyan, and black.

On the surfaces of the photoconductive drums $25y$, $25m$, $25c$, and $25k$, the laser beams L1, L2, L3, and L4 are scanned to lines extending in the longitudinal directions of the photoconductive drums $25y$, $25m$, $25c$, and $25k$.

The scanning lines of the laser beams L1, L2, L3, and L4 become straight lines if there is no component error and assembly error in the laser scanning unit 26. However, the laser scanning unit 26 has a component error and an assembly error. For this reason, the scanning lines of the laser beams L1, L2, L3, and L4 are deviated from target straight lines. If the scanning lines are not parallel to the target straight lines, adjusting slopes of the scanning lines to be described below is performed at the time of assembly. Further, the scanning lines are bent with respect to the target straight lines in some cases. In contrast, in the image forming apparatus 100 according to the embodiment, adjusting bending of the scanning lines to be described below is performed at the time of the assembly.

After the scanning lines are adjusted, the laser beams L1, L2, L3, and L4 become parallel to the target straight lines. The parallel deviation in the target straight lines is corrected by controlling a timing at which a latent image is formed.

Exposure portions of the laser beams L1, L2, L3, and L4 on the surfaces of the photoconductive drums $25y$, $25m$, $25c$, and $25k$ are discharged. The laser beams L1, L2, L3, and L4 form electrostatic latent images on the surfaces of the photoconductive drums $25y$, $25m$, $25c$, and $25k$ according to the image information.

The laser scanning unit 26 includes a housing 40, a laser light source (not illustrated), and a writing optical system 60.

Hereinafter, a direction in which a vertical line extends is referred to as a Z direction in the laser scanning unit 26 in the disposition according to the embodiment. In the Z direction, an upward vertical direction is referred to as a Z+ direction and a downward vertical direction is referred to as a Z− direction in some cases. A direction perpendicular to the central axis line of each of the photoconductive drums $25y$, $25m$, $25c$, and $25k$ on the horizontal surface perpendicular in the Z direction is referred to as an X direction. In the X direction, a direction directed from the photoconductive drum $25y$ to the photoconductive drum $25k$ is referred to as an X+ direction and a direction directed from the photoconductive drum $25k$ to the photoconductive drum $25y$ is referred to as an X− direction in some cases. A direction perpendicular to the Z and X directions is referred to as a Y direction. In the Y direction, a direction directed to the rear side illustrated in the drawing is referred to as a Y+ direction and a direction directed to the front direction illustrated in the drawing is referred to as a Y− direction in some cases.

The housing 40 fixes the laser light source (not illustrated) and the writing optical system 60 in a definite positional relation. The housing 40 is covered with a cover (not illustrated). An opening through which the laser beams L1, L2, L3, and L4 transmit is formed in the cover covering the upper portion of the housing 40.

The laser light source includes four laser diodes (hereinafter referred to as LDs), driving circuits of the LDs, and a collimator lens. The laser light generated in the laser light source is turned to a parallel beam by the collimator lens. The laser light source is fixed to a side surface of the housing 40.

The writing optical system 60 includes a cylindrical lens (not illustrated), a polygon motor 41, a fθ lens 42, and a plurality of reflection mirrors. The polygon motor 41 and the fθ lens 42 form a light scanning unit that forms a light scanning beam with which the photoconductive drum is irradiated.

Hereinafter, the configuration of the writing optical system 60 will be described along an optical path of each laser beam.

Hereinafter, when a direction on a cross-sectional surface perpendicular to the optical axis of each laser beam is described, a main scanning direction and a sub-scanning direction are used in some cases. The main scanning direction is a direction in which the laser beam is moved through rotation of a polygon mirror 41a to be described below. The sub-scanning direction is a direction perpendicular to the main scanning direction.

The cylindrical lens forms each laser beam from the laser light source on the polygon mirror 41a to be described below in the sub-scanning direction. The cylindrical lens is disposed between the laser light source and the polygon motor 41.

The polygon motor 41 scans each laser beam in a deflection manner. The polygon motor 41 rotates a rotor 41b. The polygon mirror 41a is fixed to the rotor 41b.

The polygon mirror 41a has a plurality of deflection surfaces at positions of an equal distance from a rotation axis line O of the rotor 41b. The plurality of deflection surfaces are disposed in a polygonal form when viewed in the direction directed along the rotation axis line O. A DC motor can be used as the polygon motor 41.

In the embodiment, one polygon motor 41 is used. The polygon motor 41 reflects the laser beams L1, L2, L3, and L4 at the same position when viewed in the Z direction. Therefore, all of the laser beams L1, L2, L3, and L4 are scanned in the deflection manner in the same direction when viewed in the Z direction. The rotation axis line of the polygon mirror 41a extends in the Z direction.

The polygon motor 41 is fixed at a position deviated from the center of the housing 40 in the X+ direction.

When the laser beams L1, L2, L3, and L4 are reflected from the polygon mirror 41a, the laser beams L1, L2, L3, and L4 diverge in the sub-scanning direction.

The fθ lens 42 forms the laser beams L1, L2, L3, and L4 reflected from the polygon mirror 41a on the photoconductive drums 25y, 25m, 25c, and 25k, respectively. The fθ lens 42 has fθ characteristics. Therefore, the fθ lens 42 scans the laser beams L1, L2, L3, and L4 scanned equiangularly by the polygon motor 41 to image surfaces at the same speed.

The fθ lens 42 is located in the X− direction from the polygon motor 41. The fθ lens 42 according to the embodiment includes a first lens 42A and a second lens 42B in order from the polygon motor 41.

The first lens 42A causes the laser beams L1, L2, L3, and L4 incident on the polygon mirror 41a at different positions in the Z direction to be incident.

The second lens 42B further condenses the laser beam L1 condensed by the first lens 42A. The laser beams L1, L2, L3, and L4 transmitting through the second lens 42B scan the image surfaces at the same speed through rotation of the polygon mirror 41a. The optical axes of the laser beams L1, L2, L3, and L4 transmitting through the second lens 42B are alienated from each other in parallel in the Z direction.

The plurality of reflection mirrors in the writing optical system 60 reflect the laser beams L1, L2, L3, and L4 transmitting through the fθ lens 42. The plurality of reflection mirrors in the writing optical system 60 fold the optical paths of the laser beams L1, L2, L3, and L4. The plurality of reflection mirrors in the writing optical system 60 guide the laser beam L4 to each of the surfaces of the photoconductive drums 25y, 25m, 25c, and 25k.

The plurality of mirrors of the writing optical system 60 include first mirrors 43y, 43m, 43c, and 43k, second mirrors 44m, 44c, and 44k, and third mirrors 45m, 45c, and 45k. The plurality of mirrors of the writing optical system 60 are all formed of long and thin rectangular glass plates of which reflection surfaces are formed on the external surfaces. The longitudinal directions of the plurality of mirrors arranged in the writing optical system 60 are all matched in the Y direction.

The first mirror 43y is located in the X− direction from the second lens 42B. The first mirror 43y upward reflects only the laser beam L1 emitted from the second lens 42B. The first mirror 43y guides the laser beam L1 to the surface of the photoconductive drum 25y.

The first mirror 43m, the second mirror 44m, and the third mirror 45m reflect the laser beam L2 emitted from the second lens 42B in sequence and guide the laser beam L2 to the surface of the photoconductive drum 25m.

The first mirror 43m is located in the X− direction from the second lens 42B. The first mirror 43m is located in the X+ direction from the first mirror 43y. The first mirror 43m upward reflects only the laser beam L2 emitted from the second lens 42B.

The second mirror 44m is located above the first mirror 43y. The second mirror 44m reflects the laser beam L2 reflected from the first mirror 43m in the X+ direction.

The third mirror 45m is located in the X+ direction from the second mirror 44m. The third mirror 45m reflects the laser beam L2 reflected from the second mirror 44m toward the surface of the photoconductive drum 25m.

The first mirror 43c, the second mirror 44c, and the third mirror 45c reflect the laser beam L3 emitted from the second lens 42B in sequence and guide to the surface of the photoconductive drum 25c.

The first mirror 43c is located in the X− direction from the second lens 42B. The first mirror 43c is located in the X+ direction from the first mirror 43m. The first mirror 43c upward reflects only the laser beam L3 emitted from the second lens 42B.

The second mirror 44c is located above the first mirror 43c. The second mirror 44c reflects the laser beam L3 reflected from the first mirror 43c in the X+ direction.

The third mirror 45c is located in the X+ direction from the second mirror 44c. The third mirror 45c reflects the laser beam L3 reflected from the second mirror 44c toward the surface of the photoconductive drum 25c.

The first mirror 43k, the second mirror 44k, and the third mirror 45k reflect the laser beam L4 emitted from the second lens 42B in sequence and guide the laser beam L4 to the surface of the photoconductive drum 25k.

The first mirror 43k is located in the X− direction from the second lens 42B. The first mirror 43k is located in the X+ direction from the first mirror 43c. The first mirror 43k upward reflects only the laser beam L4 emitted from the second lens 42B.

The second mirror 44k is located above the first mirror 43k. The second mirror 44k reflects the laser beam L4 reflected from the first mirror 43k in the X+ direction.

The third mirror 45k is located in the X+ direction from the second mirror 44k. The third mirror 45k reflects the laser beam L4 reflected from the second mirror 44k toward the surface of the photoconductive drum 25k.

A dust-proof glass 46 is disposed on an optical path between the first mirror 43y and the photoconductive drum 25y. Likewise, the dust-proof glass 46 is also disposed along each of an optical path between the third mirror 45m and the photoconductive drum 25m, an optical path between the third mirror 45c and the photoconductive drum 25c, and an optical path between the third mirror 45k and the photoconductive drum 25k.

The dust-proof glasses 46 fill four openings (not illustrated) covering the upper portion of the housing 40.

The laser scanning unit 26 adjusts the bending of the scanning line using the first mirror 43y and the third mirrors 45m, 45c, and 45k. The first mirror 43y and the third mirrors 45m, 45c, and 45k are reflection mirrors that reflect the laser beams L1, L2, L3, and L4 toward the immediate fronts of the photoconductive drums 25y, 25m, 25c, and 25k along the optical path.

A mirror curving adjustment unit 50 is provided in each of the first mirror 43y and the third mirrors 45m, 45c, and 45k.

The mirror curving adjustment units 50 have the same configuration. Hereinafter, the configuration of the mirror curving adjustment unit 50 will be described exemplifying a case in which the mirror curving adjustment unit 50 is provided in the first mirror 43y.

As illustrated in FIG. 3, the mirror curving adjustment unit 50 includes a support member 51, end pressure members 53, an adjustment unit pressure member 52, and a cam 56.

The support member 51 supports a first end E1 and a second end E2 of the first mirror 43y. The support member 51 has higher rigidity than the first mirror 43y.

As illustrated in FIGS. 4 and 5, the support member 51 is a channel material including a bottom surface portion 51b and side surface portions 51c and 51d.

The bottom surface portion 51b is a flat portion that covers a rear surface Mb of a reflection surface Ma of the first mirror 43y in the longitudinal direction. The length of the bottom surface portion 51b in the longitudinal direction is shorter than the length of the first mirror 43y in the longitudinal direction. The width of the bottom surface portion 51b in the transverse direction is wider than the width (a width between the side surfaces Mc and Md) of the first mirror 43y in the transverse direction.

At the end of the support member 51 in the longitudinal direction, an end that supports the first end E1 of the first mirror 43y is referred to as a first end e1. At the end of the support member 51, an end that supports the second end E2 of the first mirror 43y is referred to as a second end e2.

The side surface portions 51c and 51d are flat portions bent from the end of the bottom surface portion 51b in the transverse direction in the range of the entire length of the bottom surface portion 51b. The side surface portions 51c and 51d can be bent in the same direction with respect to the bottom surface portion 51b. The side surface portions 51c and 51d can be bent at right angles to the bottom surface portion 51b. The surface of the bottom surface portion 51b on the inside of the bending of the side surface portions 51c and 51d is referred to as an surface 51a (see FIG. 3)

A support protrusion 51e protrudes in the same direction as the side surface portions 51c and 51d from the surface 51a of the first end e1 of the bottom surface portion 51b. A support protrusion 51f protrudes in the same direction as the side surface portions 51c and 51d from the surface 51a of the second end e2 of the bottom surface portion 51b. Both of the protrusion heights of the support protrusions 51e and 51f from the surface 51a are h. The protrusion height h is sufficiently greater than a curving adjustment amount of the first mirror 43y. The first mirror 43y is curved through the adjustment of the bending of the scanning line to be described below. However, even when the first mirror 43y is curved, the rear surface Mb of the first mirror 43y does not come into contact with the bottom surface portion 51b.

The support protrusions 51e and 51f support the first mirror 43y on the rear surface Mb. The rear surface Mb of the first mirror 43y is supported at two points by the support protrusions 51e and 51f.

The side surface portions 51c and 51d protrude from the reflection surface Ma of the first mirror 43y supported by the support member 51.

As illustrated in FIG. 6, a notch portion 51g is formed in the side surface portion 51d at the first end e1 of the support member 51.

The notch portion 51g lowers the height of the side surface portion 51d with respect to the bottom surface portion 51b. The height from the bottom surface portion 51b to the notch portion 51g is lower than the reflection surface Ma of the first mirror 43y supported by the support protrusion 51e. The width of the notch portion 51g is a width into which the second pressure member 53 to be described below can be inserted. The notch portion 51g is formed at a position overlapping the protrusion position of the support protrusion 51e in the longitudinal direction of the side surface portion 51d.

As illustrated in FIG. 7, a notch portion 51h is formed in the side surface portion 51d at the second end e2 of the support member 51. The notch portion 51h lowers the height of the side surface portion 51d with respect to the bottom surface portion 51b. The height from the bottom surface portion 51b to the notch portion 51h is lower than the reflection surface Ma of the first mirror 43y supported by the support protrusion 51f. The width of the notch portion 51h is the same as the width of the notch portion 51g. The notch portion 51h is formed in the longitudinal direction of the side surface portion 51d in a range overlapping with the protrusion position of the support protrusion 51f.

As indicated by a dotted line in FIG. 4, the same notch portions 51g and 51h as those of the side surface portion 51d are formed in the side surface portion 51c at the first end e1 and the second end e2 of the support member 51. The notch portions 51g and 51h are formed at positions facing each other with the bottom surface portion 51b nipped therebetween.

As illustrated in FIG. 8, a hole portion 51p penetrating through the bottom surface portion 51b is formed at the center of the support member 51 in the longitudinal direction. A cam support plate portion 51i extends from the side surface portion 51c on the outside of the hole portion 51p. The cam support plate portion 51i protrudes from the bottom surface portion 51b. The cam support plate portion 51i protrudes on the opposite side to the protrusion direction of the side surface portion 51c. A bearing hole 51n that rotatably supports a cam 56 to be described below is provided in the cam support plate portion 51i. The center of the bearing hole 51n is located at a position of a distance d from the surface 51a of the bottom surface portion 51b.

A notch portion 51k is formed at the end of the side surface portion 51c in the protrusion direction.

The notch portion 51k lowers the height of the side surface portion 51c with respect to the bottom surface portion 51b. A height from the surface 51a to the notch portion 51k is lower than the reflection surface Ma of the first mirror 43y supported by the support protrusions 51e and 51f. Further, the height from the surface 51a to the notch portion 51k is lower than the reflection surface Ma of the first mirror 43y even when the first mirror 43y is curved within the adjustment range.

The width of the notch portion 51k is a width into which the adjustment unit pressure member 52 to be described below can be inserted. The notch portion 51k is formed in a range wider than the width of the hole portion 52p of the adjustment unit pressure member 52 in the longitudinal direction of the support member 51.

A locking protrusion 51m stopping the adjustment unit pressure member 52 to be described below protrudes inside the notch portion 51k.

As illustrated in FIG. 9, a cam support plate portion 51j extends from the side surface portion 51d on the outside of the hole portion 51p. The cam support plate portion 51j protrudes from the bottom surface portion 51b. The cam support plate portion 51j protrudes on the opposite side to the protrusion direction of the side surface portion 51d. A bearing hole 51r that rotatably supports the cam 56 to be described below is provided in the cam support plate portion 51j. The bearing hole 51r is an oval hole long in the protrusion direction of the cam support plate portion 51j. In the bearing hole 51r, the center of a circular arc portion in the protrusion direction of the cam support plate portion 51j is located at the distance d from the surface 51a of the bottom surface portion 51b.

The same notch portion 51k as that of the side surface portion 51c is formed at the end of the side surface portion 51d in the protrusion direction.

As illustrated in FIGS. 6 and 7, the end pressure members 53 press the first mirror 43y toward the support protrusions 51e and 51f. One end pressure member 53 is disposed at each of the first end e1 and the second end e2 of the support member 51. The end pressure member 53 at the first end e1 locks in the notch portion 51g of the support member 51. The end pressure member 53 at the second end e2 locks in the notch portion 51h of the support member 51.

The end pressure members 53 are formed of appropriate elastic members. For example, the end pressure members 53 are formed by folding a metal thin plate with an excellent spring property.

Hereinafter, the configuration of each end pressure member 53 will be described. This description is based on a positional relation in which the end pressure member 53 is mounted on the first end e1 (the second end e2) of the support member 51.

The end pressure member 53 includes a base portion 53a, a side plate portion 53b, a mirror pressure portion 53c, a guide portion 53d, a spring portion 53e, and a side surface pressure portion 53f (see FIG. 5)

The base portion 53a has a rectangular plate shape. The width of the base portion 53a in the transverse direction is substantially the same as the width of the support member 51 in the transverse direction. The base portion 53a faces the bottom surface portion 51b of the support member 51 in the opposite direction to the protrusion direction of the side surface portions 51c and 51d.

The side plate portion 53b is a plate-shaped portion that rises at right angles from the end of the base portion 53a in the transverse direction. As illustrated in FIG. 5, the side plate portions 53b face each other with the first mirror 43y nipped therebetween. Hereinafter, a region between the side plate portions 53b is referred to as an inside of the side plate portions 53b.

The side plate portions 53b nip the side surface portions 51c and 51d of the support member 51. In the side plate portions 53b, there is a gap between the side surface portions 51c and 51d. The side plate portions 53b can move in the protrusion direction of the side surface portions 51c and 51d.

As illustrated in FIGS. 6 and 7, the mirror pressure portion 53c is formed in a flake shape. The mirror pressure portion 53c protrudes to the inside of the side plate portion 53b at the front end of each side plate portion 53b in the protrusion direction. A distance from the base portion 53a to each mirror pressure portion 53c is longer than a distance from the bottom surface portion 51b of the support member 51 to the reflection surface Ma of the first mirror 43y.

The mirror pressure portions 53c are located above the side surface portions 51c and 51d in the notch portions 51g and 51h of the support member 51. The mirror pressure portions 53c overlap with an effective reflection region (not illustrated) on the reflection surface Ma of the first mirror 43y (see FIG. 5)

The mirror pressure portion 53c of the end pressure member 53 disposed at the first end e1 nips the first mirror 43y with the support protrusion 51e (see FIG. 6). The mirror pressure portion 53c of the end pressure member 53 disposed at the second end e2 nips the first mirror 43y with the support protrusion 51f (see FIG. 7).

The guide portion 53d is adjacent to each mirror pressure portion 53c at the front end of the side plate portion 53b in the protrusion direction. Each guide portion 53d can be bent to the inside of the side plate portion 53b toward the base portion 53a.

As illustrated in FIG. 6, each guide portion 53d at the first end e1 is folded at upward each notch portion 51g. Further, the guide portion 53d at the first end e1 nips the side surface portions 51c and 51d below each notch portion 51g with the side plate portion 53b.

As illustrated in FIG. 7, each guide portion 53d at the second end e2 is folded at upward each notch portion 51h. Further, the guide portion 53d at the second end e2 nips the side surface portions 51c and 51d below each notch portion 51h with the side plate portion 53b.

As illustrated in FIGS. 6 and 7, the spring portion 53e extends from both ends of the base portion 53a in the longitudinal direction of the first mirror 43y. The spring portion 53e is curved in a U shape toward the inside of each side plate portion 53b. The spring portion 53e forms a plate spring. When the spring portion 53e is warped toward the base portion 53a, an elastic restoring force is generated. The front end of the spring portion 53e presses the bottom surface portion 51b facing the base portion 53a. The spring portion 53e at the first end e1 presses the bottom surface portion 51b on the rear side of the support protrusion 51e (see FIG. 6). The spring portion 53e at the second end e2 presses the bottom surface portion 51b on the rear side of the support protrusion 51f (see FIG. 7).

As illustrated in FIGS. 4 and 5, the side surface pressure portion 53f has a protruding shape. The side surface pressure portion 53f protrudes from each side plate portion 53b in the longitudinal direction of the first mirror 43y. Each side surface pressure portion 53f has a protrusion protruding to the inside of the side plate portion 53b. The protrusions of the side surface pressure portions 53f presses the side surface portions 51c and 51d. Therefore, the side surface portions 51c and 51d are nipped by the side surface pressure portions 53f.

As illustrated in FIGS. 8 and 9, the adjustment unit pressure member 52 pressures the first mirror 43y supported by the support protrusions 51e and 51f against the cam 56 to be described below. The adjustment unit pressure member 52 pressures the intermediate portion of the first mirror 43y in the longitudinal direction. The adjustment unit pressure member 52 locks in the notch portion 51k of the support member 51.

The adjustment unit pressure member 52 is formed of an appropriate elastic member. For example, the adjustment unit pressure member 52 is formed by folding a metal thin plate with an excellent spring property.

Hereinafter, the configuration of the adjustment unit pressure member 52 will be described. The description is based on a positional relation in which the adjustment unit pressure member 52 is mounted on the support member 51.

The adjustment unit pressure member 52 includes a base portion 52a, a side plate portion 52b, a mirror pressure portion 52c, a guide portion 52d, a spring portion 52e, and a ratchet pressure spring 52g.

The base portion 52a has a rectangular plate shape. The width of the base portion 52a in the transverse direction is substantially the same as the width of the support member 51 in the transverse direction. A notch portion 52h is formed in the middle portion of the base portion 52a. The base portion 52a faces the bottom surface portion 51b of the support member 51 in the opposite direction to the protrusion direction of the side surface portions 51c and 51d.

The side plate portion 52b is a plate-shaped portion that rises at right angles from the end of the base portion 52a in the transverse direction. As illustrated in FIG. 5, the side plate portions 52b face each other with the first mirror 43y nipped therebetween. Hereinafter, a region between the side plate portions 52b is referred to as an inside of the side plate portions 52b.

As illustrated in FIG. 8, openings 52i and 52j are formed in the middle portion of the side plate portions 52b. The opening 52i is formed at a position at which the cam support plate portion 51i of the support member 51 is exposed. The opening 52j is formed at a position at which the cam support plate portion 51j of the support member 51 is exposed.

A pressure plate 52k extends inside the opening 52j. The pressure plate 52k tightly presses a rotational shaft portion 56a of the cam 56 to be described below against the side of the cam support plate portion 51i in the shaft direction.

The side plate portions 52b nip the side surface portions 51c and 51d of the support member 51. In the side plate portions 52b, there is a gap between the side surface portions 51c and 51d. The side plate portions 52b can move in the protrusion direction of the side surface portions 51c and 51d.

As illustrated in FIG. 5, the mirror pressure portion 52c is formed in a flake shape. The mirror pressure portion 52c protrudes to the inside of the side plate portion 52b at the front end of each side plate portion 52b in the protrusion direction. As illustrated in FIG. 9, a distance from the base portion 52a to each mirror pressure portion 52c is longer than the distance from the bottom surface portion 51b of the support member 51 to the reflection surface Ma of the first mirror 43y.

The mirror pressure portions 52c are located above the side surface portions 51c and 51d in the notch portions 51k of the support member 51. The mirror pressure portions 52c overlap with an effective reflection region (not illustrated) on the reflection surface Ma of the first mirror 43y (see FIG. 5).

As illustrated in FIG. 9, the guide portion 52d is formed at the front end of the side plate portion 52b in the protrusion direction. The guide portions 52d are formed at positions at which each mirror pressure portion 52c is nipped (see FIG. 5). A gap in which the locking protrusion 51m is entered is formed between the guide portion 52d and the mirror pressure portion 52c. Each guide portion 52d can be bent to the inside of the side plate portion 52b toward the base portion 52a.

Each guide portion 52d is folded at upward each notch portion 51k. Further, each guide portion 52d nips the side surface portions 51c and 51d below each notch portion 51k with the side plate portion 52b. Each guide portion 52d can nip the side surface portions 51c and 51d in the whole range in which the first mirror 43y moves at the time of adjustment of the bending of the scanning line to be described below.

The spring portion 52e extends from both ends of the base portion 52a in the longitudinal direction of the first mirror 43y. The spring portion 52e is curved in a U shape toward the inside of each side plate portion 52b. The spring portion 52e forms a plate spring. When the spring portion 52e is warped toward the base portion 52a, an elastic restoring force is generated. The front end of the spring portion 52e presses the bottom surface portion 51b of the support member 51 facing the base portion 52a.

The ratchet pressure spring 52g is a plate spring that protrudes from the notch portion 52h in the longitudinal direction of the first mirror 43y. The ratchet pressure spring 52g is folded from the base portion 52a toward the mirror pressure portion 52c. The ratchet pressure spring 52g nips the cam 56 to be described below with the first mirror 43y. A stopper portion 52f protrudes at the front end of the ratchet pressure spring 52g in the protrusion direction. The stopper portion 52f fixes the position of the cam 56 to be described below.

As illustrated in FIG. 10, the cam 56 includes the rotational shaft portion 56a and a cam portion 56c.

The rotational shaft portion 56a extends along a central axis line O56. The length of the rotational shaft portion 56a is a length traversing inside each side plate portion 52b and each side plate portion 52b of the adjustment unit pressure member 52. A first end f1 in the longitudinal direction of the rotational shaft portion 56a is rotatably supported by the bearing hole 51n of the support member 51. A second end f2 in the longitudinal direction of the rotational shaft portion 56a is rotatably supported by the bearing hole 51r of the support member 51. The rotational shaft portion 56a inserted through the bearing hole 51r is elastically pressed to the front side (the illustrated lower side) of the cam support plate portion 51j in the protrusion direction by the pressure plate 52k of the adjustment unit pressure member 52. The rotational shaft portion 56a is tightly pressed against the circular arc portion of the bearing hole 51r having the same axis of that of the bearing hole 51n. The pressure plate 52k presses the rotational shaft portion 56a even when the adjustment unit pressure member 52 moves at the time of adjustment of the bending of the scanning line to be described below.

The central axis line O56 is parallel to the reflection surface Ma and the rear surface Mb of the first mirror 43y locking in each mirror pressure portion 52c. The central axis line O56 extends in a direction perpendicular to the longitudinal direction of the first mirror 43y. The central axis line O56 is supported at the position of the distance d from the surface 51a of the bottom surface portion 51b.

A rotational jig engagement hole 56b is formed inside the rotational shaft portion 56a on the side of the first end f1. The rotational jig engagement hole 56b engages a rotational jig 200 that rotates the cam 56. For example, when the front end of the rotational jig 200 is rotated from a hexagonal bar, the rotational jig engagement hole 56b is a hexagonal hole fitting the hexagonal bar of the rotational jig 200.

In the intermediate portion of the rotational shaft portion 56a in the longitudinal direction, a ratchet groove 56d is formed at a position closer to the first end f1. The ratchet groove 56d is formed along the circumference of the same axis as the central axis line O56. The ratchet groove 56d extends in the axial direction of the rotational shaft portion 56a and is formed as a concave-convex portion disposed at the same pitch in a circumferential direction. The groove width of the ratchet groove 56d can engage with the stopper portion 52f of the adjustment unit pressure member 52. When the stopper portion 52f is pressed by the ratchet groove 56d by the ratchet pressure spring 52g, a position of the central axis line O56 of the cam 56 is fixed. However, when the cam 56 is rotated by a force exceeding a pressure force of the ratchet pressure spring 52g, the stopper portion 52f moves on the ratchet groove 56d.

The cam portion 56c is located in the outer circumference of the rotational shaft portion 56a to be closer to the side of the second end f2 than the ratchet groove 56d. The cam portion 56c has a flat shape extending in the outer circumference direction of the rotational shaft portion 56a. A cam surface 56e is formed on the outer circumference of the cam portion 56c. The cam portion 56c is fixed to the rotational shaft portion 56a or is integrated with the rotational shaft portion 56a.

As illustrated in FIG. 9, a distance r between the cam surface 56e and the central axis line O56 varies in the circumferential direction. A position at which the distance r is a minimum value ra is indicated by a point a. The distance r is a function of a rotational angle θ from the point a. The distance r has a maximum value rc (here, rc>ra) at a point c of "θ=θc" (here, 0<θc<2π). The distance r has "rb=(ra+rc)/2" at the point b of "θ=θb=θc/2."

The distance r is a linearly monotonously increasing function for the angle θ on a path reaching from the point a to the point c via the point b. When the rotational angle θ further increases from the point c, the distance r gradually decreases. The position returns to the point a at "θ=2π." The distance r returns to ra at the point a.

The distance rb is assumed to be rb=h+d. As described above, h indicates a protrusion amount of the support protrusions 51e and 51f. As illustrated in FIG. 9, when the cam surface 56e comes into contact with the rear surface Mb at the point b, the rear surface Mb is a flat surface that is parallel to the surface 51a of the bottom surface portion 51b. When the cam surface 56e comes into contact with the rear surface Mb at a position other than the point b, the first mirror 43y receives an external force from the cam surface 56e to be curved.

For rc and ra, "rc−rb≤δ" and "ra−rb≤δ" are assumed to be satisfied. Here, δ is an allowable curving amount of the first mirror 43y with respect to support positions of the support protrusions 51e and 51f of the first mirror 43y. The allowable curving amount is defined to be a limit of a curving amount by which the first mirror 43y does not damage.

As illustrated in FIGS. 4 and 5, the first mirror 43y is inserted into the inside of the mirror curving adjustment unit 50 having the above-described configuration. The direction of the first mirror 43y is a direction in which the rear surface Mb and the side surfaces Mc and Md face the bottom surface portion 51b and the side surface portions 51c and 51d of the support member 51, respectively.

The first end E1 and the second end E2 of the first mirror 43y are exposed outward in the longitudinal direction of the support member 51.

The example of the configuration of the mirror curving adjustment unit 50 was described exemplifying the first mirror 43y.

In regard to the first mirror 43y and the third mirrors 45m, 45c, and 45k, the disposition positions along the optical path are substantially the same as each other. The lengths of the first mirror 43y and the third mirrors 45m, 45c, and 45k are substantially the same. Therefore, the mirror curving adjustment unit 50 is mounted on any mirror without particularly changing the dimensions. Here, when the length of a reflection mirror on which the mirror curving adjustment unit 50 is mounted is different, the length of the support member 51 may be changed.

Next, methods of fixing the first mirror 43y and the third mirrors 45m, 45c, and 45k on which the mirror curving adjustment unit 50 is mounted to the housing 40 will be described. Since the fixing methods are the same, an example of the method of fixing the third mirror 45k will be described as an example.

The third mirror 45k is fixed to the housing 40 at the first end E1 and the second end E2 exposed from the support member 51.

FIGS. 11A and 11B are sectional views illustrating portions in which the third mirror 45k is fixed when viewed in the Y+ direction. The sectional views of the fixed portions of the third mirror 45m and the third mirror 45c are the same. The first mirror 43y differs from the third mirrors 45m, 45c, and 45k in a slope direction. However, when FIGS. 11A and 11B are sectional views when viewed in the Y− direction, the first mirror 43y is completely the same.

As illustrated in FIG. 11A, for example, protrusions 40a and 40b for the third mirror 45k are formed in the housing 40. The protrusions 40a and 40b position the reflection surface Ma of the first end E1.

The reflection surface Ma of the third mirror 45k comes into contact with the protrusions 40a and 40b. The protrusions 40a and 40b decide a slope angle of the third mirror 45k with respect to the horizontal surface.

The third mirror 45k is fixed to the housing 40 by a pressure spring 55 pressing the rear surface Mb toward the protrusions 40a and 40b.

As schematically illustrated in FIG. 11B, an adjustment protrusion 40c is disposed in the housing 40. The adjustment protrusion 40c positions the reflection surface Ma of the third mirror 45k at the second end E2. The adjustment protrusion 40c is connected to a driving mechanism (not illustrated). The driving mechanism (not illustrated) advances or retreats the adjustment protrusion 40c in a protrusion direction.

The reflection surface Ma of the third mirror 45k comes into contact with the front end of the adjustment protrusion 40c. When the protrusion amount of the adjustment protrusion 40c is changed, the fixed position of the second end E2 in the X direction is changed. Therefore, by moving the adjustment protrusion 40c, the slope of the scanning line of the laser beam L1 can be adjusted. When the adjustment of the slope of the scanning line ends, the position of the adjustment protrusion 40c is fixed.

The third mirror 45k is fixed to the housing 40 with the slope of the scanning line of the laser beam L1 corrected.

The example of the method of fixing the third mirror 45k to the housing 40 was described. For example, the direct fixing of the third mirror 45k to the housing 40 is not requisite. For example, the protrusions 40a and 40b may be formed in another member fixed to the housing 40. The configuration and the movement direction of the adjustment protrusion 40c are not limited to the above-described examples.

The laser scanning unit 26 was described above.

Referring back to FIG. 1, the other configuration of the image forming apparatus 100 will be continuously described.

The intermediate transfer belt 27 is formed as an endless belt. A plurality of rollers come into contact with the inner circumferential surface of the intermediate transfer belt 27. The plurality of rollers apply a tensile strength to the intermediate transfer belt 27. The intermediate transfer belt 27 is flatly tensioned. The inner circumferential surface of the intermediate transfer belt 27 comes into contact with a support roller 28a at one of the positions farthest in the tensioning direction. The inner circumferential surface of the intermediate transfer belt 27 comes into contact with a transfer belt roller 32 at the other position farthest in the tensioning direction.

The support roller 28a forms a part of the transfer unit 28 to be described below. The support roller 28a guides the intermediate transfer belt 27 to a secondary transfer position.

The transfer belt roller 32 guides the intermediate transfer belt 27 to a cleaning position.

On the illustrated lower surface side of the intermediate transfer belt 27, the image forming units 25Y, 25M, 25C, and 25K excluding the transfer roller are disposed in this order from the transfer belt roller 32 to the transfer unit 28. The image forming units 25Y, 25M, 25C, and 25K are disposed with gaps therebetween in a region between the transfer belt roller 32 and the support roller 28a.

The developing units of the image forming units 25Y, 25M, 25C, and 25K accommodate developers including toner of yellow, magenta, cyan, and black. The developing units develop electrostatic latent images on the photoconductive drums 25y, 25m, 25c, and 25k. As a result, toner images are formed on the photoconductive drums 25y, 25m, 25c, and 25k.

The transfer rollers of the image forming units 25Y, 25M, 25C, and 25K transfer (primarily transfer) the toner images on the surfaces of the photoconductive drums 25y, 25m, 25c, and 25k to the intermediate transfer belt 27.

When the toner image reaches a primary transfer position, a transfer bias is applied to each transfer roller.

The cleaning units of the image forming units 25Y, 25M, 25C, and 25K remove the toner, for example, by scraping the toner which has not been transferred to the surfaces of the photoconductive drums after the primary transfer.

The discharging units of the image forming units 25Y, 25M, 25C, and 25K irradiate the surfaces of the photoconductive drums having passed through the cleaning units with light. The discharging units remove electricity of the photoconductive drums 25y, 25m, 25c, and 25k.

In the intermediate transfer belt 27, the transfer unit 28 is disposed at a position mutually adjacent to the image forming unit 25K.

The transfer unit 28 includes the support roller 28a and a secondary transfer roller 28b. The secondary transfer roller 28b and the support roller 28a nip the intermediate transfer belt 27. A position at which the secondary transfer roller 28b and the intermediate transfer belt 27 come into contact with each other is a secondary transfer position.

The transfer unit 28 transfers the toner images on the intermediate transfer belt 27 to the surface of the sheet S at the secondary transfer position. The transfer unit 28 gives a transfer bias to the secondary transfer position. The transfer unit 28 transfers the toner images on the intermediate transfer belt 27 to the sheet S by the transfer bias.

The fixing unit 29 gives heat and pressure to the sheet S. The fixing unit 29 fixes the toner images transferred to the sheet S by the heat and the pressure.

The transfer belt cleaning unit 31 faces the transfer belt roller 32. The transfer belt cleaning unit 31 nips the intermediate transfer belt 27. The transfer belt cleaning unit 31 scrapes the toner on the surface of the intermediate transfer belt 27. The transfer belt cleaning unit 31 collects the scraped toner to a waste toner tank.

The printer unit 3 further includes a reversing unit 30. The reversing unit 30 reverses the sheet S discharged from the fixing unit 29 by switchback. The reversing unit 30 carries the reversed sheet S again to the inside of a carrying guide to the front of the resist roller 24. The reversing unit 30 reverses the sheet S to form an image on the rear surface of the sheet S.

The control unit 6 controls each apparatus portion of the image forming apparatus 100.

Next, an operation of the image forming apparatus 100 will be described.

In the image forming apparatus 100, an instruction to form an image is input from the control panel 1 or the outside to the control unit 6. The control unit 6 causes the printer unit 3 to start forming an image. The printer unit 3 supplies the sheet S with an appropriate size from the sheet supply unit 4 to the resist roller 24.

The printer unit 3 causes the laser scanning unit 26 to form latent images on the photoconductive drums 25y, 25m, 25c, and 25k. That is, laser light sources emit the laser beams L1, L2, L3, and L4 modulated based on image information.

As illustrated in FIG. 2, for example, the laser beams L1, L2, L3, and L4 are formed on the polygon mirror 41a by the cylindrical lens (not illustrated). The laser beams L1, L2, L3, and L4 are scanned in the deflection manner in the main scanning direction through rotation of the polygon mirror 41a. The laser beams L1, L2, L3, and L4 each transmit through the fθ lens 42 to be condensed.

The laser beam L1 is emitted from the second lens 42B, and then is reflected by the first mirror 43y. The laser beam L1 scans the surface of the photoconductive drum 25y.

The laser beam L2 (L3 or L4) is emitted from the second lens 42B, and then is reflected by the first mirror 43m (43c or 43k), the second mirror 44m (44c or 44k), and the third mirror 45m (45c or 45k). The laser beam L2 (L3 or L4) scans the surface of the photoconductive drum 25m (25c or 25k).

The laser beams L1, L2, L3, and L4 scan target scanning lines if there is no manufacturing error or no arrangement error in the optical components along the respective optical paths. However, it may be difficult that the manufacturing error or the arrangement error in the optical components is 0. Therefore, the scanning lines of the laser beams L1, L2, L3, and L4 are deviated from target scanning positions.

Accordingly, in the image forming apparatus 100, adjusting the scanning lines of the laser beams L1, L2, L3, and L4 so that the scanning lines are parallel to the target scanning lines is performed when at least the laser scanning unit 26 is assembled.

To cause the scanning lines of the laser beams L1, L2, L3, and L4 to be parallel to the target scanning lines, scanning line slopes and scanning line bending are corrected.

In the image forming apparatus 100 according to the embodiment, the scanning line slope and the scanning line bending of the laser beam L1 are corrected by adjusting the curving amount and the position of the first mirror 43y. In the case of the laser beams L2, L3, and L4, the positions and the curving amounts of the third mirrors 45m, 45c, and 45k are adjusted instead of the first mirror 43y.

The scanning line slope is corrected by moving the adjustment protrusion 40c, as described above. The scanning line bending is corrected using the mirror curving adjustment unit 50. The details of the adjustment of the scanning line bending using the mirror curving adjustment unit 50 will be described below.

Parallel deviation of the scanning line from the target scanning line is corrected through timing control of forming of the latent image performed by the control unit 6.

In this way, the electrostatic latent images corresponding to the respective image information are formed on the photoconductive drums 25y, 25m, 25c, and 25k.

The developing units of the image forming units 25Y, 25M, 25C, and 25K develop the respective electrostatic latent images formed on the photoconductive drums 25y, 25m, 25c, and 25k. The toner images corresponding to the electrostatic latent images are formed on the surface of the photoconductive drums 25y, 25m, 25c, and 25k.

Each toner image is primarily transferred to the intermediate transfer belt 27 by each transfer roller. At this time, a transfer timing is appropriately set according to the disposition position of each of the image forming units 25Y, 25M, 25C, and 25K. Therefore, the toner images are sequentially superimposed without color deviation along with the movement of the intermediate transfer belt 27. Each toner image is sent to the transfer unit 28.

The toner image reaching the transfer unit 28 is secondarily transferred to the sheet S fed from the resist roller 24 to the transfer unit 28. The secondarily transferred toner images are fixed to the sheet S by the fixing unit 29. The sheet S to which the toner images are fixed is discharged outside the image forming apparatus 100.

The transfer residual toner which may not be transferred to the sheet S by the transfer unit 28 is scraped by the transfer belt cleaning unit 31. The intermediate transfer belt 27 is cleaned to be reused.

The image forming on one sheet S was described above.

Next, an operation of adjusting the scanning line bending will be described.

Figure 13:
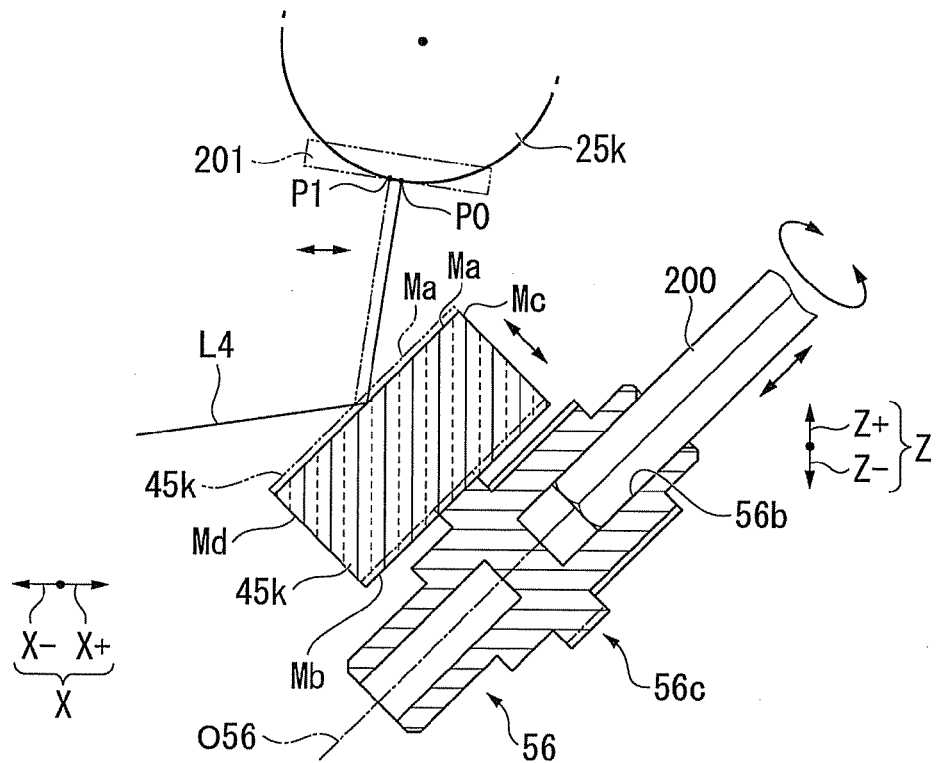
FIG. 13 is a schematic diagram for describing an operation of adjusting the bending of a scanning line.

FIGS. 12A to 12C are schematic cross-sectional views for describing an operation for curving adjustment of the reflection mirror of the image forming apparatus according to the embodiment. FIG. 13 is a schematic diagram for describing an operation of adjusting the bending of a scanning line in the image forming apparatus according to the embodiment.

A line width of a line image formed by the laser beams L1, L2, L3, and L4 in the main scanning direction is assumed to be Wi. In order to set color deviation of an image within an allowable limit, a relative line deviation amount in the sub-scanning direction at the time of color superimposition is necessarily suppressed to a value equal to or less than an allowable value ΔW. Even when the scanning lines have the same bending amount, bending directions are different in some cases. In this case, when the toner images of the corresponding scanning lines are superimposed, there is a concern of color deviation occurring by about the maximum double of the bending amount. For this reason, in the adjustment of the scanning line bending, it is necessary to adjust the bending amount and the bending direction and reduce the line deviation amount.

As the method of adjusting the scanning line bending, the curving of the reflection surface of each reflection mirror can be considered to be corrected as a single component of the reflection mirror. The mirror curving adjustment unit 50 can perform such adjustment. However, in this case, it is necessary to provide the mirror curving adjustment units 50 in all of the reflection mirrors of the writing optical system 60.

In the image forming apparatus 100 according to the embodiment, the curving amounts of the reflection surfaces Ma of the first mirror 43y and the third mirrors 45m, 45c, and 45k are adjusted. The adjustment amounts are decided according to the scanning line bending occurring in the optical system closer to the light source side than the first mirror 43y and the third mirrors 45m, 45c, and 45k. By adjusting the curving amounts of the reflection surfaces Ma of the first mirror 43y and the third mirrors 45m, 45c, and 45k, the scanning line bending occurring in the optical system on the light source side is cancelled. The first mirror 43y and the third mirrors 45m, 45c, and 45k are forcibly curved in some cases even when the reflection surfaces Ma of the first mirror 43y and the third mirrors 45m, 45c, and 45k are not curved.

First, the curving amount of the first mirror 43y occurring due to the cam 56 will be described. For simplicity, it is assumed that the reflection surface Ma and the rear surface Mb of the first mirror 43y in a natural state in which an external force is not applied are parallel to each other and the first mirror 43y is not curved.

A state in which the first mirror 43y is supported by the mirror curving adjustment unit 50 is schematically illustrated in FIGS. 12A to 12C.

As illustrated in FIG. 12A, both ends of the first mirror 43y in the longitudinal direction are supported at two points of the support protrusions 51e and 51f, respectively. The third mirror 45k is tightly pressed against the support protrusions 51e and 51f by the spring portions 53e.

The cam 56 comes into contact with the rear surface Mb at the point b of the cam surface 56e at the time of adjustment start. The reflection surface Ma is pressed toward the cam 56 by the spring portion 52e.

Specifically, as illustrated in FIG. 9, each spring portion 52e presses the bottom surface portion 51b. However, the adjustment unit pressure member 52 is pressed in a direction separated from the bottom surface portion 51b by reaction from the bottom surface portion 51b. Therefore, a force in a direction directed to the cam 56 is applied from the mirror pressure portion 52c of the adjustment unit pressure member 52 to the reflection surface Ma of the first mirror 43y.

This state is an initial state of the adjustment. In the embodiment, the first mirror 43y is in the same state as the natural state in the initial state of the adjustment.

Next, as illustrated in FIG. 10, an adjuster inserts the rotational jig 200 into the rotational jig engagement hole 56b to rotate the cam 56 about the central axis line O56. For example, the adjuster rotates the rotational jig 200 counterclockwise. For example, as illustrated in FIG. 12B, the cam surface 56e facing the rear surface Mb moves from the point b to the point a. Meanwhile, the first mirror 43y is tightly pressed against the cam surface 56e by the spring portion 52e. Specifically, as illustrated in FIG. 9, the reflection surface Ma is pressed toward the cam 56 through the mirror pressure portion 52c. The notch portion 51k is formed below the mirror pressure portion 52c. Therefore, as the distance r between the cam surface 56e and the central axis line O56 decreases, the mirror pressure portion 52c can also move.

By doing so, the intermediate portion of the first mirror 43y becomes closer to the central axis line O56 according to the movement of the cam surface 56e. In contrast, the positions of both ends of the first mirror 43y do not move from the support protrusions 51e and 51f. Therefore, the first mirror 43y is curved to be convexed downward, as illustrated in FIG. 12B. When the cam surface 56e comes into contact with the rear surface Mb at the point a, the first mirror 43y is convexed downward, as illustrated to enter a maximum curved state. However, in this case, the curving amount of the first mirror 43y is equal to or less than an allowable curving amount of the first mirror 43y.

When the adjuster rotates the rotational jig 200 counterclockwise from the initial state, the first mirror 43y is curved in the opposite way to the above-described way. As illustrated in FIG. 12C, the first mirror 43y is curved to be convexed upward, as illustrated. When the cam surface 56e comes into contact with the rear surface Mb at the point c, the first mirror 43y is convexed upward, as illustrated, to enter a maximum curved state. However, in this case, the curving amount of the first mirror 43y is equal to or less than the allowable curving amount of the first mirror 43y.

Accordingly, when the cam 56 is rotated either clockwise or counterclockwise, the first mirror 43y is curved within the range in which the first mirror 43y does not damage. The adjuster can also rotate the cam 56 in the same direction by one circumference or more.

The adjustment of the scanning line bending is performed while measuring the scanning line bending. In the embodiment, the first mirror 43y and the third mirrors 45m, 45c, and 45k are fixed to the housing 40. Then, the scanning line bending is measured by scanning the laser beams L1, L2, L3, and L4 by the polygon motor 41.

For example, FIG. 13 illustrates a state in which the third mirror 45k is adjusted. Here, in FIG. 13, the mirror curving adjustment unit 50 is not illustrated except for the housing 40 and the cam 56.

In the disposition state of the third mirror 45k, the central axis line O56 of the cam 56 extends in parallel to the reflection surface Ma in the transverse direction of the third mirror 45k. The rotational jig engagement hole 56b faces a slope upper side on which the rotational jig engagement hole 56b advances in the X+ direction and advances in the Z+ direction.

Therefore, the adjuster can insert the rotational jig 200 into the rotational jig engagement hole 56b from the upper side of the housing 40 (not illustrated). The adjuster can easily manipulate the rotational jig 200 from the outside of the housing 40. Since only the front end of the rotational jig 200 enters inside the housing 40, the rotational jig 200 can be inserted without interference with the components in the housing 40. An opening or the like for inserting the rotational jig 200 may not particularly be formed in the housing 40.

Since the rotational jig 200 is located on the rear surface side of the third mirror 45k, the laser beam L4 is not blocked due to a rotation manipulation of the rotational jig 200.

When the rotational jig 200 is rotated, the cam 56 is rotated with respect to the first mirror 43y, as described above. When the rotation of the rotational jig 200 stops, the stopper portion 52f of the ratchet pressure spring 52g engages with the ratchet groove 56d so that the rotational position is fixed. The third mirror 45k is curved according to the rotational position of the cam portion 56c. For example, the middle portion of the third mirror 45k is assumed to be moved from a position indicated by an illustrated solid line to a position indicated by a two-dot chain line by the cam 56. The optical path of the laser beam L4 after the laser beam L4 is reflected from the middle portion of the third mirror 45k moves in parallel in the X− direction, as indicated in an illustrated two-dot chain line. The position of the laser beam L4 on the photoconductive drum 25k moves from a point p0 to a point P1. A scanning line bending amount is a distance from the point P0 to the point P1.

A rotation manipulation of the rotational jig 200 is performed while measuring the scanning line bending by the curving of the third mirror 45k.

As an example of the method of measuring the scanning line bending, a method of measuring the scanning line bending from the scanning position of the laser beam L4 can be exemplified. In this case, the measurement can be performed by disposing the single laser scanning unit 26 to a measurement device. Alternatively, in the image forming apparatus 100, the measurement can be performed by disposing a measurement device instead of the image forming unit 25K.

In the measurement device, a position detection sensor 201 detecting the scanning position of the laser beam L4 is disposed on an image surface of the laser beam L4. The position detection sensor 201 can be disposed in each of both ends and a central portion in the main scanning direction. One position detection sensor 201 may be disposed when the position detection sensor 201 can move in the main scanning direction. A CCD camera or the like can be adopted as the position detection sensor 201.

The measurement device detects the scanning positions of at least three separated portions from the position detection sensors 201. The measurement device displays measurement results of the magnitude of the scanning line bending and a direction of the scanning line bending. The adjuster determines a rotational direction and a rotational amount of the rotational jig 200 based on display of the measurement device.

The scanning line bending can also be measured in measurement in which the latent image on the photoconductive drum 25k or the position of the toner image is detected.

When the scanning line bending enters the allowable range, the rotational jig 200 is removed from the cam 56. The rotation position of the cam 56 is maintained at a position at the time of adjustment end by engagement of the ratchet groove 56d and the stopper portion 52f.

Further, when there is the unadjusted reflection mirror, the same adjustment is performed by the mirror curving adjustment unit 50 mounted on the unadjusted reflection mirror.

The scanning lines of the laser beams L1, L2, L3, and L4 can be adjusted using one scanning line as a criterion. In this case, the scanning line serving as the criterion is adjusted within the allowable range. The scanning line slopes and the direction of the scanning line bending of the other scanning lines are adjusted to the scanning line slope and the direction of the scanning line bending of the scanning line serving as the criterion. In addition, the magnitude of the scanning line bending and the scanning line slopes are adjusted so that the other scanning lines approach the scanning line serving as the criterion.

By doing so, the adjustment of the scanning lines of the laser beams L1, L2, L3, and L4 in the laser scanning unit 26 ends.

In the image forming apparatus 100, as described above, the curving amounts and the curving directions of the first mirror 43y and the third mirrors 45m, 45c, and 45k can be changed by the mirror curving adjustment unit 50. Therefore, it is possible to cancel the scanning line bending by the first mirror 43y and the third mirrors 45m, 45c, and 45k and the scanning line bending occurring in the optical system closer to the light source side. As a result, the scanning line bending on the photoconductive drums 25y, 25m, 25c, and 25k is suppressed.

The scanning line bending can be adjusted from the outside of the housing 40 in a space of a narrow range on the rear surface side of the adjustment target reflection mirror. Therefore, the adjustment work can be easily performed.

Hereinafter, modification examples of the above-described embodiment will be described.

Figure 14:
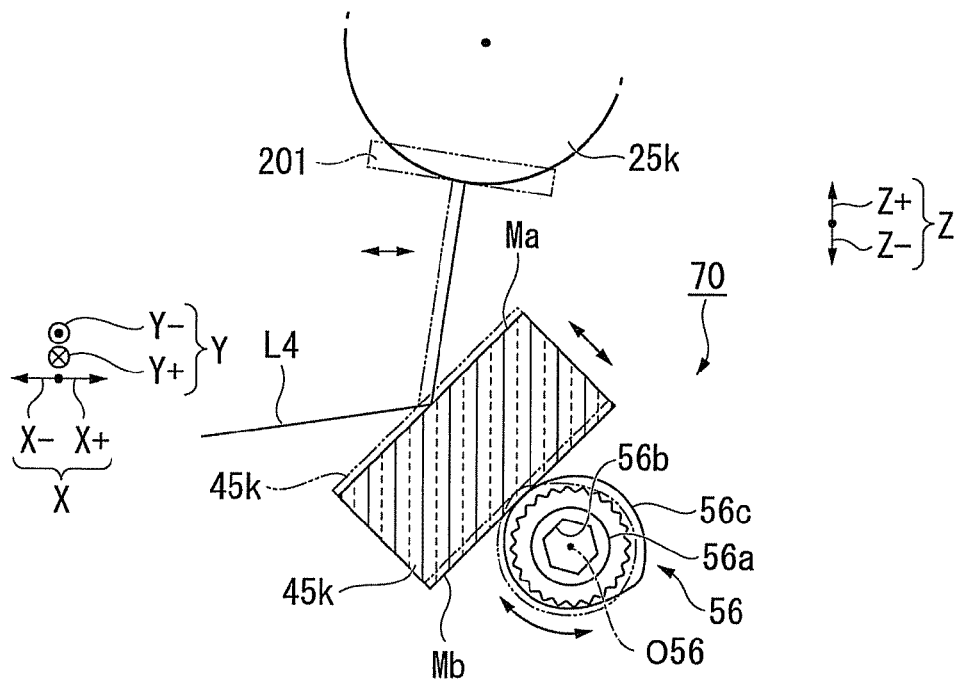
FIG. 14 is a schematic cross-sectional view for describing modification examples.

FIG. 14 is a schematic cross-sectional view for describing the modification examples of the image forming apparatus according to the embodiment.

In the image forming apparatus 100 having the above-described embodiment, the central axis line O56 of the rotational shaft portion 56a of the cam 56 extends in a direction parallel to the reflection surface of the reflection mirror and perpendicular to the longitudinal direction of the reflection mirror. However, the direction in which the central axis line O56 extends can be set to be a direction in which the adjustment is easy. For example, when the cam support plate portions 51i and 51j are disposed in directions in which the cam support plate portions 51i and 51j are sloped with respect to the side surface portions 51c and 51d in the image forming apparatus 100, the direction of the central axis line O56 can be changed.

Further, the central axis line O56 may extend in parallel to the longitudinal direction of the reflection mirror. For example, in a modification example illustrated in the main portions in FIG. 14, a mirror curving adjustment unit 70 is used instead of the mirror curving adjustment unit 50 according to the embodiment.

The mirror curving adjustment unit 70 disposes the cam 56 in parallel to the reflection surface Ma of the third mirror 45k with respect to the support member 51 and in parallel to the longitudinal direction of the third mirror 45k.

In such a modification example, the rotational jig 200 (not illustrated) can be inserted into the rotational jig engagement hole 56b of the cam 56 in the Y direction to adjust the scanning line bending.

In this case, even after a laser scanning unit 26 according to the modification example is mounted on the image forming apparatus 100, the adjustment is easily performed from the front side or the rear side of the image forming apparatus 100.

For example, in the above-described embodiment, the first mirrors 43m, 43c, and 43k located below the housing 40 is assumed to be adjusted. In this case, in order to perform the adjustment without blocking the optical path, it is necessary to insert the rotational jig 200 from the rear side of the housing 40. In this case, there is a concern of workability deteriorating when the adjustment is performed with a hand. However, when the mirror curving adjustment unit 70 is used, it is easy to perform the adjustment work easily even with a hand.

The rotational jig 200 extends along the third mirror 45k on the side of the rear surface of the third mirror 45k. Therefore, for example, even in an optical path layout in which the other light scanning beams are scanned to the upper and lower sides of the third mirror 45k, the scanning line bending can be adjusted without blocking the other light scanning beams.

In the above-described image forming apparatus 100, the polygon motor 41 reflects the laser beams L1, L2, L3, and L4 at the same position when viewed in the Z direction. However, the optical path layout of the laser beams L1, L2, L3, and L4 is not limited thereto.

For example, the polygon motor 41 may have an optical path layout in which the laser beams L1 and L2 and the laser beams L3 and L4 are distributed in mutually opposite directions.

In the above-described image forming apparatus 100, the example in which each reflection mirror adjusting the scanning line bending reflects the light scanning beam to the immediate front of the photoconductive drum along the optical path of each optical scanning beam was described. However, the reflection mirror on which the mirror curving adjustment unit 50 is mounted may be a reflection mirror which is disposed on another position.

In the above-described image forming apparatus 100, the example in which the cam 56 is adjusted with a hand via the rotational jig 200 was described. However, the rotational jig 200 may be configured to be rotated by a motor.

According to at least one of the above-described embodiments, the image forming apparatus includes the photoconductive drum, the light scanning unit, the reflection mirror, the support member, and the cam. In the image forming apparatus, the intermediate portion in the longitudinal direction of the reflection mirror of which both ends are supported by the support members can be moved by the cam in the plate thickness direction. As a result, the reflection mirror is curved. In the image forming apparatus, the scanning line bending on the photoconductive drum can be suppressed by changing the curving amount of the reflection mirror by the cam.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An image forming apparatus, comprising:
   a photoconductive drum;
   a light scanning unit that forms a light scanning beam with which the photoconductive drum is irradiated;
   a reflection mirror that guides the light scanning beam toward the photoconductive drum;
   a support member that supports both ends of the reflection mirror in a longitudinal direction;
   a cam that is provided in the support member, and comes into contact with the reflection mirror in an intermediate portion of the support member in the longitudinal direction;
   a first pressure member comprising: a first elastic member provided on an opposite side of a reflection surface of the reflection mirror; and a first pressing member that comes into contact with the reflection surface of the reflection mirror and presses the reflection mirror against the support member by a force of the first elastic member, the first pressure member being provided at a first end portion of the reflection mirror;
   a second pressure member comprising: a second elastic member provided on an opposite side of the reflection surface of the reflection mirror; and a second pressing member that comes into contact with the reflection surface of the reflection mirror and presses the reflection mirror against the support member by a force of the second elastic member, the second pressure member being provided at a second end portion of the reflection mirror, the second end portion being provided at the opposite side of the first end portion in the longitudinal direction; and a third pressure member comprising: a third elastic member provided on an opposite side of the reflection surface of the reflection mirror; and a third pressing member that comes into contact with the reflection surface of the reflection mirror and presses the reflection mirror against the cam by a force of the third elastic member, the third pressure member being provided at an intermediate portion of the reflection mirror.

2. The apparatus according to claim 1, wherein the cam includes a shaft that is supported to be rotatable with respect to the support member and a cam surface for which a distance from a central axis line of the shaft varies.

3. The apparatus according to claim 1, further comprising: a ratchet mechanism that fixes a position of the cam in the plate thickness direction to the support member.

4. The apparatus according to claim 1, wherein a movement amount of the reflection mirror by the cam is equal to or less than an allowable deformation amount of the reflection mirror in the intermediate portion.

5. The apparatus according to claim 1, wherein the reflection mirror reflects the light scanning beam along an optical path of the optical scanning beam at an immediate front of the photoconductive drum.

6. The apparatus according to claim 2, wherein the central axis line of the shaft is parallel to a reflection surface of the reflection mirror and intersects the longitudinal direction of the reflection mirror.

7. The apparatus according to claim 2, wherein the central axis line of the shaft is parallel to a reflection surface of the reflection mirror and is parallel to the longitudinal direction of the reflection mirror.

8. The apparatus according to claim 1, wherein the support member supports a rear surface of a reflection surface of the reflection mirror.

9. The apparatus according to claim 1, wherein at a position closer to an end in the longitudinal direction than a position at which the reflection mirror is supported by the support member, the reflection mirror is supported by a positioning portion regulating a positional relation with the light scanning unit.

* * * * *